(12) United States Patent  
Kruger et al.

(10) Patent No.: US 7,873,529 B2  
(45) Date of Patent: Jan. 18, 2011

(54) SYSTEM AND METHOD FOR ANALYZING AND CORRECTING RETAIL DATA

(75) Inventors: Michael W. Kruger, Glenview, IL (US); Cheryl G. Bergeon, Arlington Heights, IL (US); Arvid C. Johnson, Frankfort, IL (US)

(73) Assignee: SymphonyIRI Group, Inc., Chicago, IL (US)

( * ) Notice: Subject to any disclaimer, the term of this patent is extended or adjusted under 35 U.S.C. 154(b) by 1361 days.

(21) Appl. No.: 10/783,323

(22) Filed: Feb. 20, 2004

(65) Prior Publication Data

US 2005/0187972 A1 Aug. 25, 2005

(51) Int. Cl.  
*G06Q 10/00* (2006.01)

(52) U.S. Cl. ............................................. 705/7; 705/10

(58) Field of Classification Search ............... 705/7, 705/10  
See application file for complete search history.

(56) References Cited

U.S. PATENT DOCUMENTS

| | | | |
|---|---|---|---|
| 5,041,972 | A | 8/1991 | Frost |
| 5,758,257 | A | 5/1998 | Herz et al. |
| 6,401,070 | B1 * | 6/2002 | McManus et al. ............... 705/1 |
| 6,636,585 | B2 | 10/2003 | Salzberg et al. |
| 6,636,862 | B2 | 10/2003 | Lundahl et al. |
| 6,662,192 | B1 | 12/2003 | Rebane |
| 6,708,156 | B1 | 3/2004 | Gonten |
| 6,839,682 | B1 | 1/2005 | Blume et al. |
| 7,027,843 | B2 * | 4/2006 | Cromer et al. ............... 455/574 |
| 7,379,890 | B2 | 5/2008 | Myr et al. |
| 7,523,047 | B1 * | 4/2009 | Neal et al. .................. 705/10 |
| 2002/0099597 | A1 | 7/2002 | Gamage et al. |
| 2002/0169657 | A1 | 11/2002 | Singh et al. |

| | | |
|---|---|---|
| 2003/0028417 | A1 | 2/2003 Fox |

(Continued)

FOREIGN PATENT DOCUMENTS

WO WO 01/80137 A2 10/2001

(Continued)

OTHER PUBLICATIONS

Swait, Joffre; Andrews, Rick L; "Enriching Scannel Panel Models with Choice Experiments", Fall 2003, Marketing Science, 22, 4; ABI/INFORM Global. pp. 442-460.*

(Continued)

*Primary Examiner*—Jonathan G Sterrett  
(74) *Attorney, Agent, or Firm*—Strategic Patents, P.C.

(57) ABSTRACT

A computer system and method is disclosed that analyzes and corrects retail data. The system and method includes several client workstations and one or more servers coupled together over a network. A database stores various data used by the system. A business logic server uses competitive and complementary fusion to analyze and correct some of the data sources stored in database server. The data fusion process itself is an iterative one—utilizing both competitive and complementary fusion methods. In competitive fusion, two or more data sources that provide overlapping attributes are compared against each other. More accurate/reliable sources are used to correct less accurate/reliable sources. In complementary fusion, relationships modeled where data sources overlap are projected to areas of the data framework in which fewer sources exist—enhancing the accuracy/reliability of those fewer sources even in the absence of the other sources upon which the models were based.

33 Claims, 27 Drawing Sheets

U.S. PATENT DOCUMENTS

| | | | |
|---|---|---|---|
| 2003/0046120 A1* | 3/2003 | Hoffman et al. | 705/7 |
| 2003/0046121 A1* | 3/2003 | Menninger et al. | 705/7 |
| 2003/0065555 A1 | 4/2003 | von Gonten et al. | |
| 2003/0083925 A1 | 5/2003 | Weaver et al. | |
| 2003/0088474 A1 | 5/2003 | Hoffman et al. | |
| 2003/0171978 A1 | 9/2003 | Jenkins et al. | |
| 2003/0200129 A1 | 10/2003 | Klaubauf et al. | |
| 2006/0020641 A1 | 1/2006 | Walsh et al. | |
| 2008/0136582 A1 | 6/2008 | Kruger et al. | |
| 2008/0136583 A1 | 6/2008 | Kruger et al. | |
| 2008/0140480 A1 | 6/2008 | Kruger et al. | |
| 2008/0143474 A1 | 6/2008 | Kruger et al. | |
| 2008/0147459 A1 | 6/2008 | Kruger et al. | |
| 2008/0147699 A1 | 6/2008 | Kruger et al. | |
| 2008/0154843 A1 | 6/2008 | Kruger | |
| 2008/0154884 A1 | 6/2008 | Kruger et al. | |
| 2008/0154885 A1 | 6/2008 | Kruger et al. | |
| 2008/0162223 A1 | 7/2008 | Kruger et al. | |
| 2008/0162404 A1 | 7/2008 | Kruger et al. | |
| 2008/0162460 A1 | 7/2008 | Kruger et al. | |
| 2008/0162461 A1 | 7/2008 | Kruger et al. | |
| 2008/0162462 A1 | 7/2008 | Kruger et al. | |
| 2008/0162463 A1 | 7/2008 | Kruger et al. | |
| 2008/0162464 A1 | 7/2008 | Kruger et al. | |
| 2008/0162465 A1 | 7/2008 | Kruger et al. | |
| 2008/0162466 A1 | 7/2008 | Kruger et al. | |
| 2008/0162571 A1 | 7/2008 | Kruger et al. | |
| 2008/0162572 A1 | 7/2008 | Kruger et al. | |
| 2008/0168027 A1 | 7/2008 | Kruger et al. | |
| 2008/0168028 A1 | 7/2008 | Kruger et al. | |
| 2008/0168104 A1 | 7/2008 | Kruger et al. | |
| 2008/0256027 A1 | 10/2008 | Kruger et al. | |
| 2008/0256028 A1 | 10/2008 | Kruger et al. | |
| 2008/0288889 A1 | 11/2008 | Hunt et al. | |
| 2008/0319829 A1 | 12/2008 | Hunt et al. | |
| 2009/0006490 A1 | 1/2009 | Hunt et al. | |
| 2009/0094274 A1 | 4/2009 | Gorelik et al. | |

FOREIGN PATENT DOCUMENTS

| | | |
|---|---|---|
| WO | WO 03/001428 A2 | 1/2003 |

OTHER PUBLICATIONS

Qian, Jiahe; Spencer, Bruce D; "Optimally Weighted Means in Stratified Sampling", 1994, amstat.org, pp. 863-866.*

Guadagni, Peter M; Little, John D. C.; "A logit model of brand choice calibrated on scanner data", Summer 1983, Marketing Science, vol. 2, No. 3, pp. 203-238.*

Baron, Steve; Lock, Andrew; "The Challenges of Scanner Data", Jan. 1995, The Journal of the Operational Research Society, vol. 46, No. 1, pp. 50-61.*

Bronnenberg, Bart J; Mahajan, Vijay; "Unobserved Retailer Behavior in Multimarket Behavior: Joint Spatial Dependence in Market Shares and Promotional Variables", Summer 2001, Marketing Science, 20, 3, ABI/INFORM Global p. 284.*

McCullock, Robert; Rossi, Peter E. "An exact likelihood Analysis of the multinomial probit model", 1994, Journal of Econometrics, 64, pp. 207-240.*

Parameter bias from unobserved effects in the multinomial logit model of consumer C Abramson, RL Andrews, IS Currim . . . —Journal of Marketing . . . , 2000—Am Marketing Assoc.*

Commercial use of UPC scanner data: Industry and academic perspectives RE Bucklin, S Gupta—Marketing Science, 1999—jstor.org.*

Brand choice, purchase incidence, and segmentation: An integrated modeling RE Bucklin, S Gupta—Journal of Marketing Research, 1992—jstor.org.*

Missing price and coupon availability data in scanner panels: Correcting for the self selection bias in choice model parameters T Erdem, MP Keane, B Sun—Journal of Econometrics, 1998—Elsevier.*

Do household scanner data provide representative inferences from brand choices: a comparison with store data S Gupta, P Chintagunta, A Kaul, DR Wittink—Journal of Marketing . . . , 1996—jstor.org.*

Combining sources of preference data D Hensher, J Louviere, J Swait—Journal of Econometrics, 1998—Elsevier.*

Purchase frequency, sample selection, and price sensitivity: The heavy-user bias BD Kim, PE Rossi—Marketing Letters, 1994—Springer.*

Kong, E.B.; Dietterich, T.G., "Error-Correcting Output Coding Corrects Bias and Variance," http://citeseer.nj.nec.com/kong95errorcorrecting.html.

Lohse, G.L.; Bellman, S.; Johnson, E.J.; "Consumer buying behavior on the Internet: Findings from panel data," http://knowledge.wharton.upenn.edu/pdfs/793.pdf.

, "U.S. Appl. No. 11/926,308, Non-Final Office Action mailed Aug. 14, 2008", OARN , 12 pgs.

, "U.S. Appl. No. 11/926,309, Non-Final Office Action mailed Aug. 14, 2008", OARN , 12.

, "U.S. Appl. No. 11/926,316, Non-Final Office Action mailed Oct. 1, 2008", OARN , 12 pgs.

, "U.S. Appl. No. 11/926,320, Non-Final Office Action mailed Aug. 5, 2008", OARN , 12 pgs.

, "U.S. Appl. No. 11/926,329, Non-Final Office Action mailed Nov. 30, 2009" 8.

, "U.S. Appl. No. 11/926,332, Non-Final Office Action mailed Aug. 7, 2008", OARN , 12.

, "U.S. Appl. No. 11/926,335, Non-Final Office Action mailed Aug. 6, 2008", OARN , 12.

, "U.S. Appl. No. 11/926,343, Non-Final Office Action mailed Aug. 14, 2008", OARN , 12.

, "U.S. Appl. No. 11/926,347 Non-Final Office Action mailed Oct. 23, 2008", OARN , 12 Pgs.

, "U.S. Appl. No. 11/926,351, Non-Final Office Action mailed Aug. 14, 2008", OARN , 12 pgs.

, "U.S. Appl. No. 11/926,360 Non-Final Office Action mailed Aug. 14, 2008", OARN , 12 Pgs.

, "U.S. Appl. No. 11/926,366 Non-Final Office Action mailed Sep. 19, 2008", OARN , 12 Pgs.

, "U.S. Appl. No. 11/926,368 Non-Final Office Action mailed Sep. 19, 2008", OARN , 12 Pgs.

, "U.S. Appl. No. 11/926,374, Non-Final Office Action mailed Aug. 7, 2008", OARN , 12.

, "U.S. Appl. No. 11/927,502, Non-Final Office Action mailed Jan. 8, 2009", ,12 pgs.

, "U.S. Appl. No. 11/927,528, Non-Final Office Action mailed Nov. 30, 2009", , 11 pgs.

, "U.S. Appl. No. 11/927,550, Non-Final Office Action mailed Jan. 8, 2009", , 12 pgs.

, "U.S. Appl. No. 11/927,565, Non-Final Office Action mailed Jan. 9, 2009", , 12 pgs.

, "U.S. Appl. No. 11/926,354,Non-Final office Action mailed Sep. 30, 2008", OARN , 12 pgs.

, "U.S. Appl. No. 11/926,372, Non-Final Office Action mailed Sep. 19, 2008", OARN , 12 pgs.

, "U.S. Appl. No. 11/926,381, Non-Final office Action mailed Sep. 19, 2008", OARN , 12 pgs.

, "U.S. Appl. No. 11/926,383, Non-Final office Action mailed Sep. 19, 2008", OARN , 12 pgs.

-, , "U.S. Appl. No. 11/926,358, Non-Final Office Action mailed Oct. 7, 2008.", OARN , 12 pgs.

Baron, Steve et al., "The Challenges of Scanner Data", *The Journal of Operational Research Society* (vol. 46, No. 1) Jan. 1995, 50-61.

Bronnenberg, Bart J. et al., "Unobserved Retailer Behavior in Multimarket Data: Joint Spatial Dependence in Market Shares and Promotion Variables", *in Market Science 20,3* Summer 2001.

Gerald L, S et al., "Consumer buying behavior on the Internet: Find ings from panel data ", *Wharton Forum on Electron ic Commerce The Wharton School University of Pennsylvania, Department of marketing Columbia School of Business Columbia University* Aug. 23, 1999.

Guadagni, Peter M. et al., "A Logit Model of Brand Choice Calibrated on Scanner Data", *In Marketing Science*, vol. 2, No. 3 Summer 1983 , 203-238.

Kruger, Michael W., "U.S. Appl. No. 10/783,323", May 8, 2009.

McCulloch, Robert et al., "An Exact Likelihood Analysis of the Multinomial Probit Model", *Journal of Econometrics*, vol. 64 1994, 207-240.

Qian, J et al., ""Optimally weighted Means in Stratified Sampling"", amstat.org 1994, 863-866.

Swait, Joffre et al., "Enriching Scanner Panel Models with Choice Experiments", *in Marketing Science* (22, 4, ABI) Fall 2003, 442-460.

, "U.S. Appl. No. 11/926,318, Non-Final Office Action mailed Feb. 2, 2010", , 53.

, "U.S. Appl. No. 11/927,515, Non-Final Office Action mailed Feb. 17, 2010", , 10 Pgs.

Malhotra, et al., "Marketing research in the new millennium: Emergin issues and trends. Marketing Intelligence and Planning", vol. 19, No. 4. 2001, 216-235 pgs..

"U.S. Appl. No. 12/021,495, Non-Final Office Action mailed May 26, 2010", , 15.

\* cited by examiner

| UPC | BRAND | MANUFACTURER | TYPE | SIZE | FDMx POS | FDMx PANEL |
|---|---|---|---|---|---|---|
| 1 | OLD FAITHFUL | GOOD CO. | REGULAR | BIG | 75 | 71 |
| 2 | OLD FAITHFUL | GOOD CO. | REGULAR | MEDIUM | 200 | 153 |
| 3 | OLD FAITHFUL | GOOD CO. | REGULAR | SMALL | 50 | 30 |
| 4 | NEW KID | GOOD CO. | SPECIAL | MEDIUM | 100 | 112 |
| 5 | NEW KID | GOOD CO. | SPECIAL | SMALL | 30 | 27 |
| 6 | GOOD OLD | OTHER CO. | REGULAR | BIG | 50 | 45 |
| 7 | GOOD OLD | OTHER CO. | REGULAR | MEDIUM | 170 | 124 |
| 8 | NEWER YET | OTHER CO. | SPECIAL | BIG | 20 | 33 |
| 9 | NEWER YET | OTHER CO. | SPECIAL | MEDIUM | 50 | 53 |
| 10 | NEWER YET | OTHER CO. | SPECIAL | SMALL | 20 | 19 |
| 11 | PLAIN OLD | PRIVATE LABEL | REGULAR | BIG | 30 | 43 |
| 12 | PLAIN OLD | PRIVATE LABEL | REGULAR | MEDIUM | 100 | 109 |
| 13 | PLAIN NEW | PRIVATE LABEL | SPECIAL | BIG | 20 | 41 |
| 14 | PLAIN NEW | PRIVATE LABEL | SPECIAL | MEDIUM | 80 | 126 |
| | | | | GRAND TOTAL | 995 | 986 |

Fig. 11

|  |  | POS | PANEL | RATIO |
|---|---|---|---|---|
| 354 — | REGULAR | 675 | 594 | 0.88 |
| 356 — | SPECIAL | 320 | 401 | 1.25 |

358 360 362

| UPC | BRAND | MANUFACTURER | TYPE | SIZE | FDMx POS | ADJ PANEL (PL) | ADJ PANEL (PL & TYPE) |
|---|---|---|---|---|---|---|---|
| 1 | OLD FAITHFUL | GOOD CO. | REGULAR | BIG | 75 | 81 | 92 |
| 2 | OLD FAITHFUL | GOOD CO. | REGULAR | MEDIUM | 200 | 175 | 199 |
| 3 | OLD FAITHFUL | GOOD CO. | REGULAR | SMALL | 50 | 34 | 39 |
| 4 | NEW KID | GOOD CO. | SPECIAL | MEDIUM | 100 | 128 | 102 |
| 5 | NEW KID | GOOD CO. | SPECIAL | SMALL | 30 | 31 | 25 |
| 6 | GOOD OLD | OTHER CO. | REGULAR | BIG | 50 | 52 | 59 |
| 7 | GOOD OLD | OTHER CO. | REGULAR | MEDIUM | 170 | 142 | 161 |
| 8 | NEWER YET | OTHER CO. | SPECIAL | BIG | 20 | 38 | 30 |
| 9 | NEWER YET | OTHER CO. | SPECIAL | MEDIUM | 50 | 61 | 49 |
| 10 | NEWER YET | OTHER CO. | SPECIAL | SMALL | 20 | 22 | 18 |
| 11 | PLAIN OLD | PRIVATE LABEL | REGULAR | BIG | 30 | 31 | 35 |
| 12 | PLAIN OLD | PRIVATE LABEL | REGULAR | MEDIUM | 100 | 79 | 90 |
| 13 | PLAIN NEW | PRIVATE LABEL | SPECIAL | BIG | 20 | 30 | 24 |
| 14 | PLAIN NEW | PRIVATE LABEL | SPECIAL | MEDIUM | 80 | 91 | 73 |
|  |  |  |  | ADJUSTED GRAND TOTAL | 995 | 995 | 996 |

Fig. 13

|     |     | POS | PANEL | RATIO |
|-----|-----|-----|-------|-------|
| 374 | BIG | 195 | 240   | 1.23  |
| 375 | MEDIUM | 700 | 674 | 0.96  |
| 376 | SMALL | 100 | 82   | 0.82  |

| UPC | BRAND | MANUFACTURER | TYPE | SIZE | FDMx POS | ADJ PANEL (PL & TYPE) | ADJ PANEL (ALL) |
|-----|-------|--------------|------|------|----------|------------------------|-----------------|
| 1   | OLD FAITHFUL | GOOD CO. | REGULAR | BIG | 75 | 92 | 75 |
| 2   | OLD FAITHFUL | GOOD CO. | REGULAR | MEDIUM | 200 | 199 | 207 |
| 3   | OLD FAITHFUL | GOOD CO. | REGULAR | SMALL | 50 | 39 | 48 |
| 4   | NEW KID | GOOD CO. | SPECIAL | MEDIUM | 100 | 102 | 106 |
| 5   | NEW KID | GOOD CO. | SPECIAL | SMALL | 30 | 25 | 30 |
| 6   | GOOD OLD | OTHER CO. | REGULAR | BIG | 50 | 59 | 48 |
| 7   | GOOD OLD | OTHER CO. | REGULAR | MEDIUM | 170 | 161 | 167 |
| 8   | NEWER YET | OTHER CO. | SPECIAL | BIG | 20 | 30 | 24 |
| 9   | NEWER YET | OTHER CO. | SPECIAL | MEDIUM | 50 | 49 | 51 |
| 10  | NEWER YET | OTHER CO. | SPECIAL | SMALL | 20 | 18 | 22 |
| 11  | PLAIN OLD | PRIVATE LABEL | REGULAR | BIG | 30 | 35 | 28 |
| 12  | PLAIN OLD | PRIVATE LABEL | REGULAR | MEDIUM | 100 | 90 | 93 |
| 13  | PLAIN NEW | PRIVATE LABEL | SPECIAL | BIG | 20 | 24 | 20 |
| 14  | PLAIN NEW | PRIVATE LABEL | SPECIAL | MEDIUM | 80 | 73 | 76 |
|     |       |              |      | ADJUSTED GRAND TOTAL | 995 | 996 | 995 |

| UPC | BRAND | MANUFACTURER | TYPE | SIZE | FDMx POS 392 | FDMx PANEL 394 |
|---|---|---|---|---|---|---|
| 1 | OLD FAITHFUL | GOOD CO. | REGULAR | BIG | 75 | 71 |
| 2 | OLD FAITHFUL | GOOD CO. | REGULAR | MEDIUM | 200 | 153 |
| 3 | OLD FAITHFUL | GOOD CO. | REGULAR | SMALL | 50 | 30 |
| 4 | NEW KID | GOOD CO. | SPECIAL | MEDIUM | 100 | 112 |
| 5 | NEW KID | GOOD CO. | SPECIAL | SMALL | 30 | 27 |
| 6 | GOOD OLD | OTHER CO. | REGULAR | BIG | 50 | 45 |
| 7 | GOOD OLD | OTHER CO. | REGULAR | MEDIUM | 170 | 124 |
| 8 | NEWER YET | OTHER CO. | SPECIAL | BIG | 20 | 33 |
| 9 | NEWER YET | OTHER CO. | SPECIAL | MEDIUM | 50 | 53 |
| 10 | NEWER YET | OTHER CO. | SPECIAL | SMALL | 20 | 19 |
| 11 | PLAIN OLD | PRIVATE LABEL | REGULAR | BIG | 30 | 43 |
| 12 | PLAIN OLD | PRIVATE LABEL | REGULAR | MEDIUM | 100 | 109 |
| 13 | PLAIN NEW | PRIVATE LABEL | SPECIAL | BIG | 20 | 41 |
| 14 | PLAIN NEW | PRIVATE LABEL | SPECIAL | MEDIUM | 80 | 126 |
| | | | | GRAND TOTAL | 995 | 986 |

396 — TOTALS BY MANUFACTURER

| | POS | PANEL |
|---|---|---|
| PRIVATE LABEL | 230 | 319 |
| NON-PL | 765 | 667 |

398 — TOTALS BY TYPE

| | POS | PANEL |
|---|---|---|
| REGULAR | 675 | 575 |
| SPECIAL | 320 | 411 |

400 — TOTALS BY SIZE

| | POS | PANEL |
|---|---|---|
| BIG | 195 | 233 |
| MEDIUM | 700 | 677 |
| SMALL | 100 | 76 |

Fig. 15

| | POS | PANEL | RATIO |
|---|---|---|---|
| PRIVATE LABEL | 230 | 319 | 1.39 |
| NON-PL | 765 | 667 | 0.87 |

| | POS | PANEL | RATIO |
|---|---|---|---|
| REGULAR | 675 | 575 | 0.85 |
| SPECIAL | 320 | 411 | 1.28 |

| | POS | PANEL | RATIO |
|---|---|---|---|
| BIG | 195 | 233 | 1.19 |
| MEDIUM | 700 | 677 | 0.97 |
| SMALL | 100 | 76 | 0.76 |

| UPC | BRAND | MANUFACTURER | TYPE | SIZE | FDMx POS | FDMx PANEL | ADJ PANEL |
|---|---|---|---|---|---|---|---|
| 1 | OLD FAITHFUL | GOOD CO. | REGULAR | BIG | 75 | 71 | 80 |
| 2 | OLD FAITHFUL | GOOD CO. | REGULAR | MEDIUM | 200 | 153 | 213 |
| 3 | OLD FAITHFUL | GOOD CO. | REGULAR | SMALL | 50 | 30 | 53 |
| 4 | NEW KID | GOOD CO. | SPECIAL | MEDIUM | 100 | 112 | 103 |
| 5 | NEW KID | GOOD CO. | SPECIAL | SMALL | 30 | 27 | 32 |
| 6 | GOOD OLD | OTHER CO. | REGULAR | BIG | 50 | 45 | 51 |
| 7 | GOOD OLD | OTHER CO. | REGULAR | MEDIUM | 170 | 124 | 173 |
| 8 | NEWER YET | OTHER CO. | SPECIAL | BIG | 20 | 33 | 25 |
| 9 | NEWER YET | OTHER CO. | SPECIAL | MEDIUM | 50 | 53 | 49 |
| 10 | NEWER YET | OTHER CO. | SPECIAL | SMALL | 20 | 19 | 22 |
| 11 | PLAIN OLD | PRIVATE LABEL | REGULAR | BIG | 30 | 43 | 30 |
| 12 | PLAIN OLD | PRIVATE LABEL | REGULAR | MEDIUM | 100 | 109 | 95 |
| 13 | PLAIN NEW | PRIVATE LABEL | SPECIAL | BIG | 20 | 41 | 19 |
| 14 | PLAIN NEW | PRIVATE LABEL | SPECIAL | MEDIUM | 80 | 126 | 73 |
| | | | | ADJUSTED GRAND TOTAL | 995 | 986 | 1018 |

Fig. 16

| UPC | BRAND | MANUFACTURER | TYPE | SIZE | RETAILER 1 POS | RETAILER 1 PANEL | RETAILER 2 POS | RETAILER 2 PANEL | RETAILER 3 PANEL | CLIENT SHIPMENT |
|---|---|---|---|---|---|---|---|---|---|---|
| 1 | OLD FAITHFUL | GOOD CO. | REGULAR | BIG | 25 | 21 | | 23 | 16 | 80 |
| 2 | OLD FAITHFUL | GOOD CO. | REGULAR | MEDIUM | 70 | 43 | 130 | 35 | 40 | 194 |
| 3 | OLD FAITHFUL | GOOD CO. | REGULAR | SMALL | 0 | 0 | | 12 | 0 | |
| 4 | NEW KID | GOOD CO. | SPECIAL | MEDIUM | 35 | 30 | | 20 | 23 | 23 |
| 5 | NEW KID | GOOD CO. | SPECIAL | SMALL | 10 | 11 | | 0 | 5 | 83 |
| 6 | GOOD OLD | OTHER CO. | REGULAR | BIG | 20 | 14 | | 13 | 12 | 17 |
| 7 | GOOD OLD | OTHER CO. | REGULAR | MEDIUM | 40 | 28 | 82 | 25 | 20 | |
| 8 | NEWER YET | OTHER CO. | SPECIAL | BIG | 6 | 6 | | 9 | 9 | |
| 9 | NEWER YET | OTHER CO. | SPECIAL | MEDIUM | 20 | 18 | | 13 | 12 | |
| 10 | NEWER YET | OTHER CO. | SPECIAL | SMALL | 0 | 0 | | 6 | 0 | |
| 15 | PLAIN OLD | PRIVATE LABEL | REGULAR | BIG | 10 | 12 | 51 | 10 | 13 | |
| 16 | PLAIN OLD | PRIVATE LABEL | REGULAR | MEDIUM | 35 | 35 | | 22 | 22 | |
| 17 | PLAIN NEW | PRIVATE LABEL | SPECIAL | BIG | 8 | 16 | | 12 | 12 | |
| 18 | PLAIN NEW | PRIVATE LABEL | SPECIAL | MEDIUM | 25 | 35 | | 17 | 31 | |
| | | | | | 304 | 269 | 263 | 217 | 215 | |

|  | POS | PANEL | RATIO |
|---|---|---|---|
| PRIVATE LABEL | 230 | 319 | 1.39 |
| NON-PL | 765 | 667 | 0.87 |

430a

|  | POS | PANEL | RATIO |
|---|---|---|---|
| REGULAR | 675 | 575 | 0.85 |
| SPECIAL | 320 | 411 | 1.28 |

430b

|  | POS | PANEL | RATIO |
|---|---|---|---|
| BIG | 195 | 233 | 1.19 |
| MEDIUM | 700 | 677 | 0.97 |
| SMALL | 100 | 76 | 0.76 |

430c

| UPC | BRAND | MANUFACTURER | TYPE | SIZE | POS | RETAILER 1 PANEL | ADJ PANEL | POS | RETAILER 2 PANEL | ADJ PANEL | POS | RETAILER 3 PANEL | ADJ PANEL | CLIENT SHIPMENT |
|---|---|---|---|---|---|---|---|---|---|---|---|---|---|---|
| 1 | OLD FAITHFUL | GOOD CO. | REGULAR | BIG | 25 | 21 | 24 |  | 23 | 26 | 16 | 18 | 80 |
| 2 | OLD FAITHFUL | GOOD CO. | REGULAR | MEDIUM | 70 | 43 | 60 |  | 35 | 49 | 40 | 56 | 194 |
| 3 | OLD FAITHFUL | GOOD CO. | REGULAR | SMALL | 0 | 0 | 0 |  | 12 | 21 | 0 | 0 | 23 |
| 4 | NEW KID | GOOD CO. | SPECIAL | MEDIUM | 35 | 30 | 28 | 130 | 20 | 18 | 23 | 21 | 83 |
| 5 | NEW KID | GOOD CO. | SPECIAL | SMALL | 10 | 11 | 13 |  | 0 | 0 | 5 | 6 | 17 |
| 6 | GOOD OLD | OTHER CO. | REGULAR | BIG | 20 | 14 | 16 |  | 13 | 15 | 12 | 14 |  |
| 7 | GOOD OLD | OTHER CO. | REGULAR | MEDIUM | 40 | 28 | 39 |  | 25 | 35 | 20 | 28 |  |
| 8 | NEWER YET | OTHER CO. | SPECIAL | BIG | 6 | 6 | 4 | 82 | 9 | 7 | 9 | 7 |  |
| 9 | NEWER YET | OTHER CO. | SPECIAL | MEDIUM | 20 | 18 | 17 |  | 13 | 12 | 12 | 11 |  |
| 10 | NEWER YET | OTHER CO. | SPECIAL | SMALL | 0 | 0 | 0 |  | 6 | 7 | 0 | 0 |  |
| 15 | PLAIN OLD | PRIVATE LABEL | REGULAR | BIG | 10 | 12 | 9 |  | 10 | 7 | 13 | 9 |  |
| 16 | PLAIN OLD | PRIVATE LABEL | REGULAR | MEDIUM | 35 | 35 | 31 | 51 | 22 | 19 | 22 | 19 |  |
| 17 | PLAIN NEW | PRIVATE LABEL | SPECIAL | BIG | 8 | 16 | 8 |  | 12 | 6 | 12 | 6 |  |
| 18 | PLAIN NEW | PRIVATE LABEL | SPECIAL | MEDIUM | 25 | 35 | 20 |  | 17 | 10 | 31 | 18 |  |
|  |  |  |  |  | 304 | 269 | 267 | 263 | 217 | 231 | 215 | 212 |  |

432a 434a 432b 434b 432c 434c

| UPC | BRAND | MANUFACTURER | TYPE | SIZE | RETAILER 1 POS | RETAILER 1 ADJ PANEL | RETAILER 2 POS | RETAILER 2 ADJ PANEL | RETAILER 3 POS | RETAILER 3 ADJ PANEL | CLIENT SHIPMENT | PANEL TOTAL |
|---|---|---|---|---|---|---|---|---|---|---|---|---|
| 1 | OLD FAITHFUL | GOOD CO. | REGULAR | BIG | 25 | 24 | 130 | 26 | 18 | 18 | 80 | 68 |
| 2 | OLD FAITHFUL | GOOD CO. | REGULAR | MEDIUM | 70 | 60 | | 49 | 56 | 56 | 194 | 164 |
| 3 | OLD FAITHFUL | GOOD CO. | REGULAR | SMALL | 0 | 0 | | 21 | 0 | 0 | 23 | 21 |
| 4 | NEW KID | GOOD CO. | SPECIAL | MEDIUM | 35 | 28 | | 18 | 21 | 21 | 83 | 67 |
| 5 | NEW KID | GOOD CO. | SPECIAL | SMALL | 10 | 13 | | 0 | 6 | 6 | 17 | 19 |
| 6 | GOOD OLD | OTHER CO. | REGULAR | BIG | 20 | 16 | 82 | 15 | 14 | 14 | | |
| 7 | GOOD OLD | OTHER CO. | REGULAR | MEDIUM | 40 | 39 | | 35 | 28 | 28 | | |
| 8 | NEWER YET | OTHER CO. | SPECIAL | BIG | 6 | 4 | | 7 | 7 | 7 | | |
| 9 | NEWER YET | OTHER CO. | SPECIAL | MEDIUM | 20 | 17 | 51 | 12 | 11 | 11 | | |
| 10 | NEWER YET | OTHER CO. | SPECIAL | SMALL | 0 | 0 | | 7 | 0 | 0 | | |
| 15 | PLAIN OLD | PRIVATE LABEL | REGULAR | BIG | 10 | 9 | | 7 | 9 | 9 | | |
| 16 | PLAIN OLD | PRIVATE LABEL | REGULAR | MEDIUM | 35 | 31 | | 19 | 19 | 19 | | |
| 17 | PLAIN NEW | PRIVATE LABEL | SPECIAL | BIG | 8 | 8 | | 6 | 6 | 6 | | |
| 18 | PLAIN NEW | PRIVATE LABEL | SPECIAL | MEDIUM | 25 | 20 | | 10 | 18 | 18 | | |
| | | | | | 304 | 267 | 263 | 231 | 397 | 212 | | |

| | 'POS' | PANEL |
|---|---|---|
| RETAILER 1 | 304 | 267 |
| RETAILER 2 | 263 | 231 |
| SHIPMENTS | 397 | 339 |

| | RATIO |
|---|---|
| | 0.88 |
| | 0.88 |
| | 0.85 |

$C_{blended} \sim 0.87$ $$C_{blended} = \frac{w_1 C_1 + w_2 C_2 + w_3 C_3}{\Sigma w_i}$$

where $w_1 = \frac{\sigma_2^2 + \sigma_3^2}{\sigma_1^2 + \sigma_2^2 + \sigma_3^2}$, etc.

Fig. 19

| UPC | BRAND | MANUFACTURER | TYPE | SIZE | RETAILER 1 POS | RETAILER 1 ADJ PANEL | RETAILER 2 POS | RETAILER 2 ADJ PANEL | RETAILER 3 ADJ PANEL | CLIENT SHIPMENT |
|---|---|---|---|---|---|---|---|---|---|---|
| 1 | OLD FAITHFUL | GOOD CO. | REGULAR | BIG | 25 | 27 | | 30 | 21 | 80 |
| 2 | OLD FAITHFUL | GOOD CO. | REGULAR | MEDIUM | 70 | 69 | 130 | 56 | 64 | 194 |
| 3 | OLD FAITHFUL | GOOD CO. | REGULAR | SMALL | 0 | 0 | | 24 | 0 | |
| 4 | NEW KID | GOOD CO. | SPECIAL | MEDIUM | 35 | 32 | | 21 | 24 | 83 |
| 5 | NEW KID | GOOD CO. | SPECIAL | SMALL | 10 | 15 | | 0 | 7 | 17 |
| 6 | GOOD OLD | OTHER CO. | REGULAR | BIG | 20 | 18 | | 17 | 16 | |
| 7 | GOOD OLD | OTHER CO. | REGULAR | MEDIUM | 40 | 45 | 82 | 40 | 32 | |
| 8 | NEWER YET | OTHER CO. | SPECIAL | BIG | 6 | 5 | | 8 | 8 | |
| 9 | NEWER YET | OTHER CO. | SPECIAL | MEDIUM | 20 | 19 | | 14 | 13 | |
| 10 | NEWER YET | OTHER CO. | SPECIAL | SMALL | 0 | 0 | | 8 | 0 | |
| 15 | PLAIN OLD | PRIVATE LABEL | REGULAR | BIG | 10 | 10 | 51 | 8 | 11 | |
| 16 | PLAIN OLD | PRIVATE LABEL | REGULAR | MEDIUM | 35 | 35 | | 22 | 22 | |
| 17 | PLAIN NEW | PRIVATE LABEL | SPECIAL | BIG | 8 | 9 | | 6 | 6 | |
| 18 | PLAIN NEW | PRIVATE LABEL | SPECIAL | MEDIUM | 25 | 23 | | 11 | 21 | |
| | | | | | 304 | 307 | 263 | 266 | 244 | |

$444 \sim C_{blended} \sim 0.87$ 450a, 450b, 450c

Fig. 20

| UPC | BRAND | MANUFACTURER | TYPE | SIZE | RETAILER 2 | | | RETAILER 3 | | |
|---|---|---|---|---|---|---|---|---|---|---|
| | | | | | REALITY | PRE-FUSION | POST-FUSION | REALITY | PRE-FUSION | POST-FUSION |
| 1 | OLD FAITHFUL | GOOD CO. | REGULAR | BIG | 30 | 23 | 30 | 20 | 16 | 21 |
| 2 | OLD FAITHFUL | GOOD CO. | REGULAR | MEDIUM | 60 | 35 | 56 | 62 | 40 | 64 |
| 3 | OLD FAITHFUL | GOOD CO. | REGULAR | SMALL | 20 | 12 | 24 | 0 | 0 | 0 |
| 4 | NEW KID | GOOD CO. | SPECIAL | MEDIUM | 20 | 20 | 21 | 24 | 23 | 24 |
| 5 | NEW KID | GOOD CO. | SPECIAL | SMALL | 0 | 0 | 0 | 7 | 5 | 7 |
| 6 | GOOD OLD | OTHER CO. | REGULAR | BIG | 15 | 13 | 17 | 14 | 12 | 16 |
| 7 | GOOD OLD | OTHER CO. | REGULAR | MEDIUM | 40 | 25 | 40 | 32 | 20 | 32 |
| 8 | NEWER YET | OTHER CO. | SPECIAL | BIG | 6 | 9 | 8 | 7 | 9 | 8 |
| 9 | NEWER YET | OTHER CO. | SPECIAL | MEDIUM | 13 | 13 | 14 | 14 | 12 | 13 |
| 10 | NEWER YET | OTHER CO. | SPECIAL | SMALL | 8 | 6 | 8 | 0 | 0 | 0 |
| 15 | PLAIN OLD | PRIVATE LABEL | REGULAR | BIG | 9 | 10 | 8 | 10 | 13 | 11 |
| 16 | PLAIN OLD | PRIVATE LABEL | REGULAR | MEDIUM | 25 | 22 | 22 | 23 | 22 | 22 |
| 17 | PLAIN NEW | PRIVATE LABEL | SPECIAL | BIG | 7 | 12 | 6 | 7 | 12 | 6 |
| 18 | PLAIN NEW | PRIVATE LABEL | SPECIAL | MEDIUM | 10 | 17 | 11 | 24 | 31 | 21 |
| | | | | | 263 | 217 | 266 | 244 | 215 | 244 |
| | | | | | RMSE | 8.7 | 2.0 | RMSE | 7.3 | 1.2 |

Fig. 21

SYSTEM AND METHOD FOR ANALYZING AND CORRECTING RETAIL DATA

BACKGROUND

The present invention relates to computer software, and more particularly, but not exclusively, relates to systems and methods for analyzing and correcting retail data.

The measurement of sales in retail channels can be done via a variety of methods. Initially, sample-based audits of consumer purchases at check-out were extensively utilized—but were costly and subject to significant potential inaccuracies. With the advent and accuracy improvement in scanner-based point of sale (POS) data, tracking services such as those offered by Information Resources, Inc. (IRI), and A.C. Nielsen (ACN) are able to provide highly-granular (in terms of item, venue, and time), highly-accurate measurement of sales in several retail channels—including food/grocery, drug, mass merchandise, convenience, and military commissary. These POS-based offerings can be sample-based—i.e., rely on a statistically determined subset of the target population—or census-based—i.e., use all available data from all available venues.

While POS-based measurement offerings do an excellent job of reporting "what" sold, they provide little insight into "why" something sold—since they provide no consumer-level data. To fill this need, market research companies such as IRI and ACN have recruited national consumer panels—in which panelists report their households' purchases on a regular basis. This longitudinal sample allows the development of much deeper consumer insights (e.g., brand switching, trial and repeat, etc.).

However, consumer panels are not without their problems. As with any sample-based survey, consumer panels are subject to two types of errors—i.e., sampling errors and biases—where the total error is given by the sum: $(\text{Total Error})^2 = (\text{Sampling Error})^2 + (\text{Bias})^2$.

Sampling errors are those errors attributable to the normal (random) variation that would be expected due to the fact that, by the very act of sampling, measurements are not being taken from the entire population. Sampling errors can be reduced by increasing the sample size since the standard deviation of the sampling distribution (often referred to as the "standard error") decreases with the square root of the sample size.

Biases are systematic errors that affect any sample taken by a particular sampling method. Because these errors are systematic, they are not affected by the size of the sample. Examples of panel biases include, but are not limited to:

Recruitment bias—in which households recruited to participate in the panel are not representative of the target population (e.g., the overall population of the United States);

Self-selection bias—in which households who choose to participate in the panel have slightly different buying habits than the average household (e.g., an orientation toward using promotions or adopting new products);

Panelist turnover bias—in which the reporting effectiveness (accuracy and consistency) of panelists may vary over the time period in which they participate in the panel;

Hereditary bias—in which individuals within a household share a tendency toward certain behaviors or medical conditions;

Compliance bias—in which certain purchases or purchase occasions are consistently underreported by panelists;

Item placement bias—in which panelists report products purchased that have not been accurately captured and/or classified in the hierarchy maintained by the data collector; and Projection bias—in which the weighting or projection system cannot fully adjust all geo-demographics or is stressed by over- or under-sampled segments of the target population.

While both bias and sampling error are present in consumer panel data, for panels of a size significant enough to be of use in tracking consumer purchases (e.g., the IRI and ACN panels), the vast majority of the error that is present is due to bias. Further, since bias is unaffected by sample size, the negative impact of bias relative to the negative impact of sampling error worsens as the panel size increases.

The negative impact of bias is substantially larger than that of sampling error for most products. Increasing the size of the sample (i.e., the size of the panel) will reduce only the sampling error and may, in fact, worsen any bias that may be present. Given the sizes of today's consumer panels, there is limited advantage to be gained by increasing the size of the panel—since over 90% of the total error is often due to non-sampling errors (i.e., bias).

There has been little progress in the area of developing a systematic method of identifying and quantifying these biases. Further advancements are needed in this area.

Another area of concern in retail sales measurement is "coverage". Coverage includes both the number of channels in which measurements are reported and the business usefulness of those measurements. While Information Resources, Inc.'s (IRI's) point-of-sale (POS) based services provide excellent coverage of the Food/Grocery, Drug, Mass (excluding WALMART®), Convenience, and Military channels, these channels may account for only 50% of a manufacturer's sales—and as little as 20% of its sales growth. Non-tracked, growth channels—e.g., Club, Dollar, WALMART®—are, thus, becoming an increasingly important part of manufacturers' businesses while at the same time having little data available in the way of actionable sales measurement information. Further advancements are also needed in this area.

SUMMARY

One form of the present invention is a unique system for analyzing and correcting retail data.

Other forms include unique systems and methods to identify, quantify, and correct consumer panel biases. Yet another form includes unique systems and methods to model relationships where data sources overlap to project values in areas in which fewer sources exist.

Another form includes operating a computer system that has several client workstations and servers coupled together over a network. At least one server is a database server that stores sale data for various data sources, product identifier and attribute categorizations, calculated factors, and other data. External sources can be used to feed the data store on a scheduled or on-demand basis. At least one server is a server that contains business logic for analyzing and correcting some of the data sources stored in database server. Some client workstations can be used to administer settings used in process of analyzing and correcting the data sources. Other client workstations can be used to view the corrected and/or uncorrected data in a multi-dimensional format using a graphical user interface.

Another form includes providing a computer system that uses multiple data sources to support inferences that would not be feasible based upon any single data source when used alone. Sales are positioned along product, venue, and time dimension hierarchies. Characteristics of the data source determine the level of aggregation at which the data can be positioned in the framework. For example, POS data may be available weekly in a particular channel; however, direct store delivery (DSD) data may be available at a daily level, and still other measures may be available only at a monthly or quarterly level. The situation is similar along the product and venue dimensions—ranging from the specificity of the sale of a particular UPC-coded item at a particular store to the generality of total category sales within a channel (across all geographies).

Once this data framework is populated, the data fusion process itself is an iterative one, utilizing both competitive and complementary fusion methods. In "competitive fusion", two or more data sources that provide overlapping measurements along at least one dimension are compared ("competed") against each other at some level of aggregation along the product, venue, and time dimensions. More accurate/reliable sources are used to correct less accurate/reliable sources. In "complementary fusion", relationships modeled where data sources overlap are projected to areas of the data framework in which fewer (or even a single) sources exist—enhancing the accuracy/reliability of those fewer (or single) sources even in domains where data from of the other sources upon which the models were based do not exist. The process is iterative in that the competitive and complementary fusion methodologies can be repeated at varying level of aggregation of the data framework.

Another form includes providing a method for identifying and quantifying biases in consumer panel data so that the inherent utility of the consumer panel data may be enhanced. This method is termed competitive fusion. At least two data sources are used, with at least one assumed to be more accurate than the other—e.g., scanner-based POS data and consumer panel purchase data. The data sources are aligned along a common framework (i.e., data model or hierarchy) along the dimensions of product (item), venue (channel and/or geography), and/or time, with aggregation along these dimensions as necessary. The attributes associated with the framework are identified along which the framework may be characterized. The data sources are compared along these attributes—quantifying the impact of the attributes on the less-accurate data source.

After these biases have been identified and quantified, the usefulness of the consumer panel data may be enhanced. The effect of the biases may be corrected for via modeling; i.e., the raw data may be adjusted to reduce or eliminate the effect of the biases. Furthermore, as appropriate, panel management practices may be changed in order to remove or lessen the source of bias in the panel itself.

Yet another form of the present invention includes providing a method for using complementary fusion to "project" the results and relationships from the competitive fusion method onto consumer panel data in a channel with incomplete/less data than desired (e.g. data from WALMART®) to help enhance the accuracy of the Panel data source. At this point, competitive fusion may be used again in several possible ways and at several levels of aggregation along the venue, time, and/or product dimensions in order to develop independent estimates against which the complementary-fused estimate may be competed:

Publicly available data about the incomplete channel (e.g., channel reports, reported sales and financials, store databases, geo-demographics, etc.) may be used to develop an independent venue (channel) estimate.

Publicly available data about the category of interest (e.g., category studies, industry reports, reported sales/financials, etc.) may be used to develop an independent category estimate.

Private data from manufacturer-partners (e.g., shipment data, delivery data, retailer-supplied data, etc.) may be used to develop independent channel and category estimates. Due to the potentially sensitive nature of some of these data sources, this competitive fusion may be performed inside a manufacturer's facility—as an auxiliary input to the baseline model.

Private data from retailer-partners within a Collaborative Retail Exchange may be used in some venues to develop independent channel and category estimates.

Yet other forms, embodiments, objects, advantages, benefits, features, and aspects of the present invention will become apparent from the detailed description and drawings contained herein.

BRIEF DESCRIPTION OF THE DRAWINGS

FIG. 11 is a data table illustrating hypothetical data elements stored in the database of FIG. 1 to be used in accordance with the procedure of FIG. 6.

FIG. 13 is a data table illustrating hypothetical data elements that are stored in the database of FIG. 1 and are adjusted according to factors for a second attribute in accordance with the procedure of FIG. 6.

FIG. 14 is a data table illustrating hypothetical data elements that are stored in the database of FIG. 1 and are adjusted according to factors for a third attribute in accordance with the procedure of FIG. 6.

FIG. 15 is a data table illustrating hypothetical data elements stored in the database of FIG. 1, with attribute summaries, and used in accordance with the procedure of FIG. 7.

FIG. 16 is a data table illustrating hypothetical data elements that are stored in the database of FIG. 1 and are adjusted according to factors for three attributes in accordance with the procedure of FIG. 7.

FIG. 17 is a data table illustrating hypothetical data elements by retailer that are stored in the database of FIG. 1 and used in accordance with the complementary fusion procedure of FIG. 8.

FIG. 18 is a data table illustrating hypothetical data elements by retailer that are stored in the database of FIG. 1, adjusted using complementary fusion according to the factors calculated in accordance with the procedure of FIG. 7, as described in the procedure of FIG. 8.

FIG. 19 is a data table illustrating hypothetical data elements by retailer that are stored in the database of FIG. 1 and are used to perform another iteration of competitive fusion, including calculating blended factors, as described in the procedures of FIG. 9 and FIG. 10.

FIG. 20 is a data table illustrating hypothetical data elements by retailer that are stored in the database of FIG. 1 and updated based upon the blended factor, as described in the procedures of FIG. 9 and FIG. 10.

FIG. 21 is a data table illustrating hypothetical real, original, and corrected values stored in the database of FIG. 1 to show how the competitive and complementary fusion process helped improve the data, as described in the procedures of FIG. 9.

DETAILED DESCRIPTION OF SELECTED EMBODIMENTS

Figure 1:
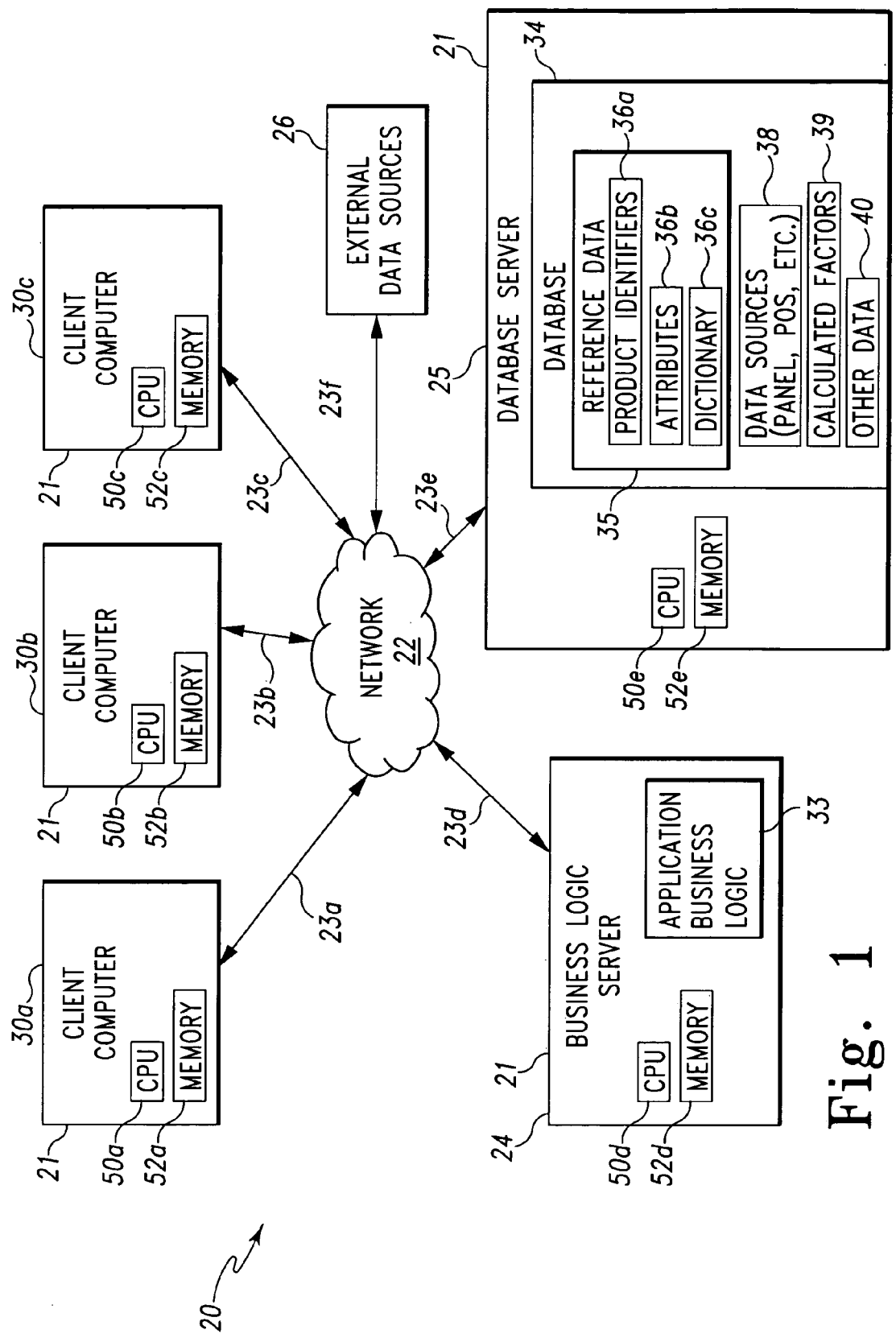
FIG. 1 is a diagrammatic view of a computer system of one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One embodiment of the present invention includes a unique system for identifying, quantifying, and correcting consumer panel biases, and then using overlapping areas of the data sources to project values in areas where fewer or less complete sources exist. FIG. 1 is a diagrammatic view of computer system 20 of one embodiment of the present invention. Computer system 20 includes computer network 22. Computer network 22 couples together a number of computers 21 over network pathways 23a-e. More specifically, system 20 includes several servers, namely business logic server 24 and database server 25. System 20 also includes external data sources 26, which in various embodiments include other computers, files, electronic and/or paper data sources. External data sources 26 are optionally coupled to network over pathway 23f. System 20 also includes client workstations 30a, 30b, and 30c (collectively client workstations 30). While computers 21 are each illustrated as being either a server or a client, it should be understood that any of computers 21 may be arranged to provide both a client and server functionality, solely a client functionality, or solely a server functionality. Furthermore, it should be understood that while six computers 21 are illustrated, more or fewer may be utilized in alternative embodiments.

Computers 21 include one or more processors or CPUs (50a, 50b, 50c, 50d, and 50e, respectively) and one or more types of memory (52a, 52b, 52c, 52d, and 52e, respectively). Each memory 52a, 52b, 52c, 52d, and 52e includes a removable memory device. Each processor may be comprised of one or more components configured as a single unit. Alternatively, when of a multi-component form, a processor may have one or more components located remotely relative to the others. One or more components of each processor may be of the electronic variety defining digital circuitry, analog circuitry, or both. In one embodiment, each processor is of a conventional, integrated circuit microprocessor arrangement, such as one or more PENTIUM III or PENTIUM 4 processors supplied by INTEL Corporation of 2200 Mission College Boulevard, Santa Clara, Calif. 95052, USA.

Each memory (removable or generic) is one form of computer-readable device. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read-Only Memory (PROM), Electronically Programmable Read-Only Memory (EPROM), or Electrically Erasable Programmable Read-Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

Although not shown in FIG. 1 to preserve clarity, in one embodiment each computer 21 is coupled to a display. Computers 21 may be of the same type, or be a heterogeneous combination of different computing devices. Likewise, the displays may be of the same type, or a heterogeneous combination of different visual devices. Although again not shown to preserve clarity, each computer 21 may also include one or more operator input devices such as a keyboard, mouse, track ball, light pen, and/or microtelecommunicator, to name just a few representative examples. Also, besides display, one or more other output devices may be included such as loudspeaker(s) and/or a printer. Various display and input device arrangements are possible.

Computer network 22 can be in the form of a wired or wireless Local Area Network (LAN), Municipal Area Network (MAN), Wide Area Network (WAN) such as the Internet, a combination of these, or such other network arrangement as would occur to those skilled in the art. The operating logic of system 20 can be embodied in signals transmitted over network 22, in programming instructions, dedicated hardware, or a combination of these. It should be understood that more or fewer computers 21 can be coupled together by computer network 22.

In one embodiment, system 20 operates at one or more physical locations where business logic server 24 is configured as a server that hosts and runs application business logic 33, database server 25 is configured as a database 34 that stores reference data 35 (e.g. product identifiers 36a, attributes 36b, and a dictionary 36c), at least two retail data sources (such as point-of-sale and panel data) 38, calculated factors 39, and other data 40. In one embodiment, external data 26 is imported to database server 25 from a mainframe extract file that is generated on a periodic basis. Various other scenarios are also possible for using and importing external data to database server 25. In another embodiment, external data sources are not used. In one embodiment, database 34 of database server 25 is a relational database and/or a data warehouse. Alternatively or additionally, database 34 can be a series of files, a combination of database tables and external files, calls to external web or other services that return data, and various other arrangements for accessing data for use in a program as would occur to one of ordinary skill in the art. Client workstations 30 are configured for providing one or more user interfaces to allow a user to modify settings used by business logic 33 and/or to view the retail data sources 38 of database 34 in a multi-dimensional format. Typical applications of system 20 would include more or fewer client workstations of this type at one or more physical locations, but three have been illustrated in FIG. 1 to preserve clarity. Furthermore, although two servers are shown, it will be appreciated by those of ordinary skill in the art that the one or more features provided by business logic server 24 and database server 25 could be provided on the same computer or varying other arrangements of computers at one or more physical locations and still be within the spirit of the invention. Farms of dedicated servers could also be provided to support the specific features if desired.

Figure 2:
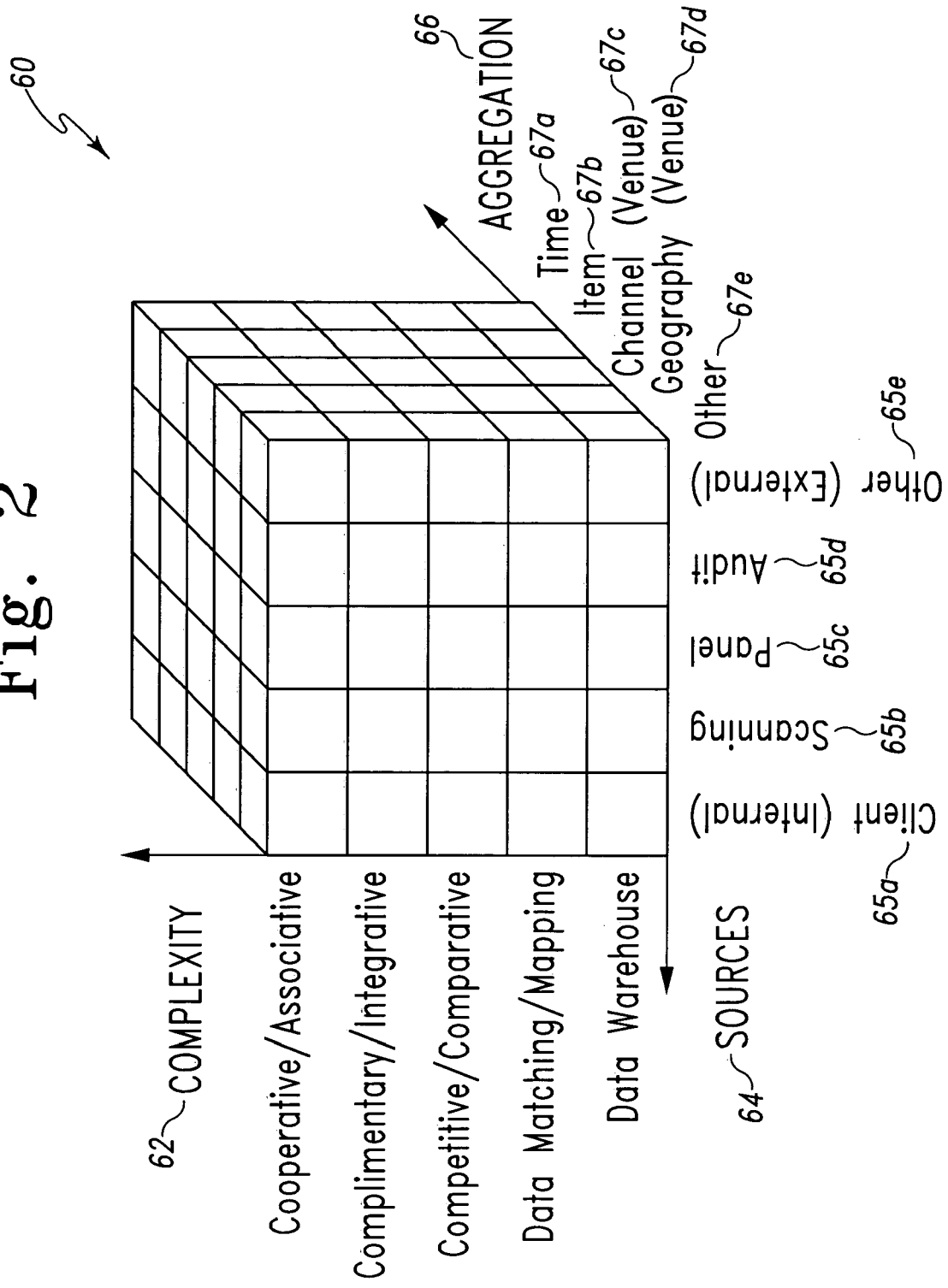
FIG. 2 is a multi-dimensional diagram illustrating the data space used by the system of FIG. 1.

FIG. 2 is a multi-dimensional cube 60 that illustrates a way of conceptually thinking about the elements stored in database 34 of system 20. Cube 60 contains three dimensions: complexity 62, sources 64, and aggregation 66. In one embodiment, at least part of the data in database 34 is categorized according to complexity 62, sources 64, and aggregation 66 axes of multi-dimensional cube 60 for analysis, viewing, and/or reporting. Cube 60 helps illustrate the concept that the aggregation dimension 66 is multi-dimensional, although other dimensions could be used than illustrated. Examples of elements of the source dimension 64 includes client (internal) data 65a, scanning (point-of-sale) data 65b, panel data 65c, audit data 66d, and other (external) data 66e, as a few examples. Examples of elements of the aggregation dimension 66 include time 67a, item (product) 67b, channel (venue) 67c, geography (venue) 67d, and other 67e, to name a few examples. Various dimensions of cube 60 are used in the competitive fusion and complementary fusion processes described herein.

Figure 3:
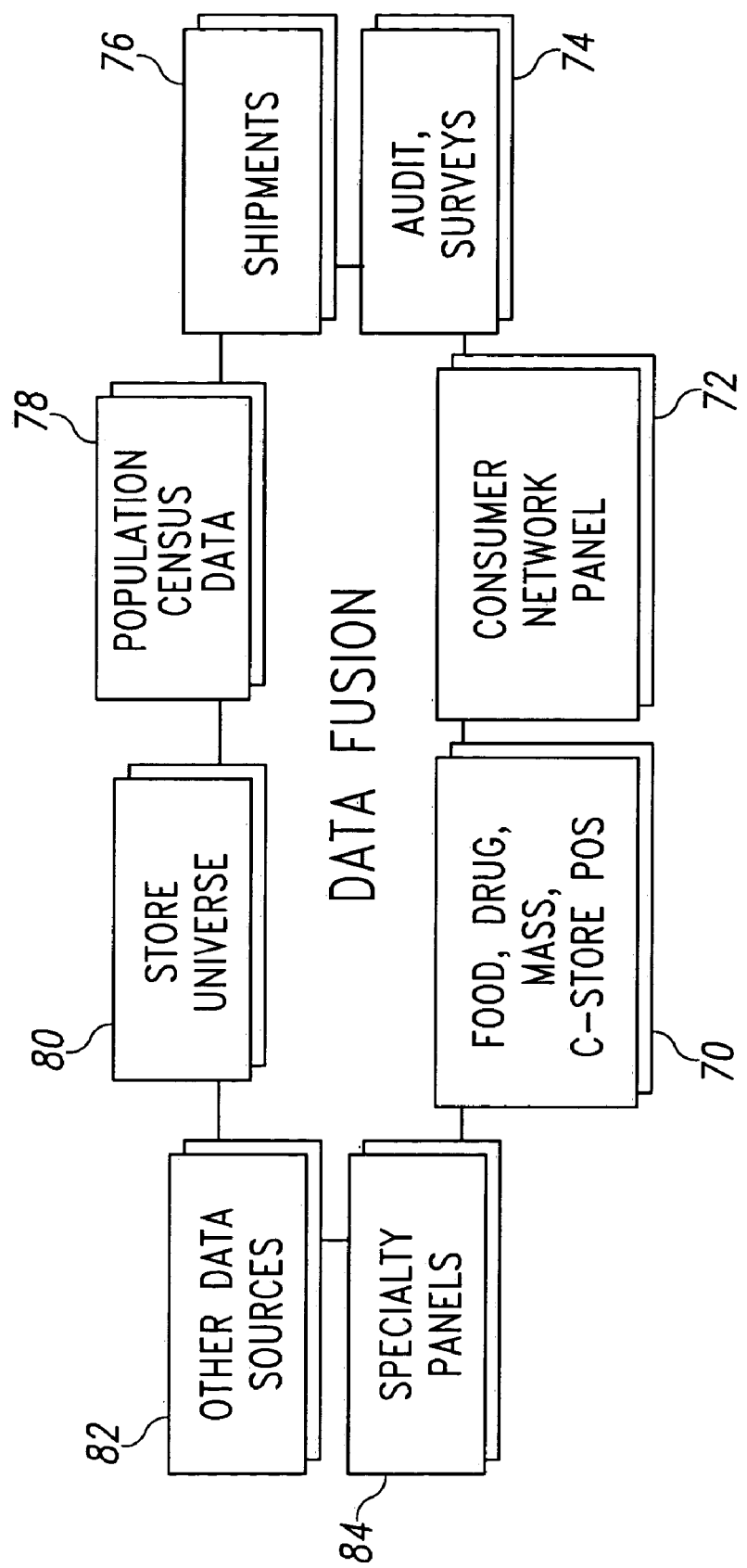
FIG. 3 is a block diagram illustrating selected data sources that are used by the system of FIG. 1.

FIG. 3 is a block diagram illustrating further examples of the one or more retail data sources (36 in FIGS. 1 and 64 in FIG. 2) that can be used by the system of FIG. 1 in the competitive fusion and complementary fusion processes described herein. Point-of-sale data 70, consumer panel data 72, audit/survey data 74 including causal (promotional) data, shipment data 76 from anywhere in supply chain, population census data 78 including geo-demographic data, store universe data 80, other data sources 82, and specialty panels 84 are examples of the types of data that can be used with system 20. The types of data that can be used with system 20 are not limited to traditional retailers. For example, data collected during any part of the supply chain could be used as a data source.

Figure 4:
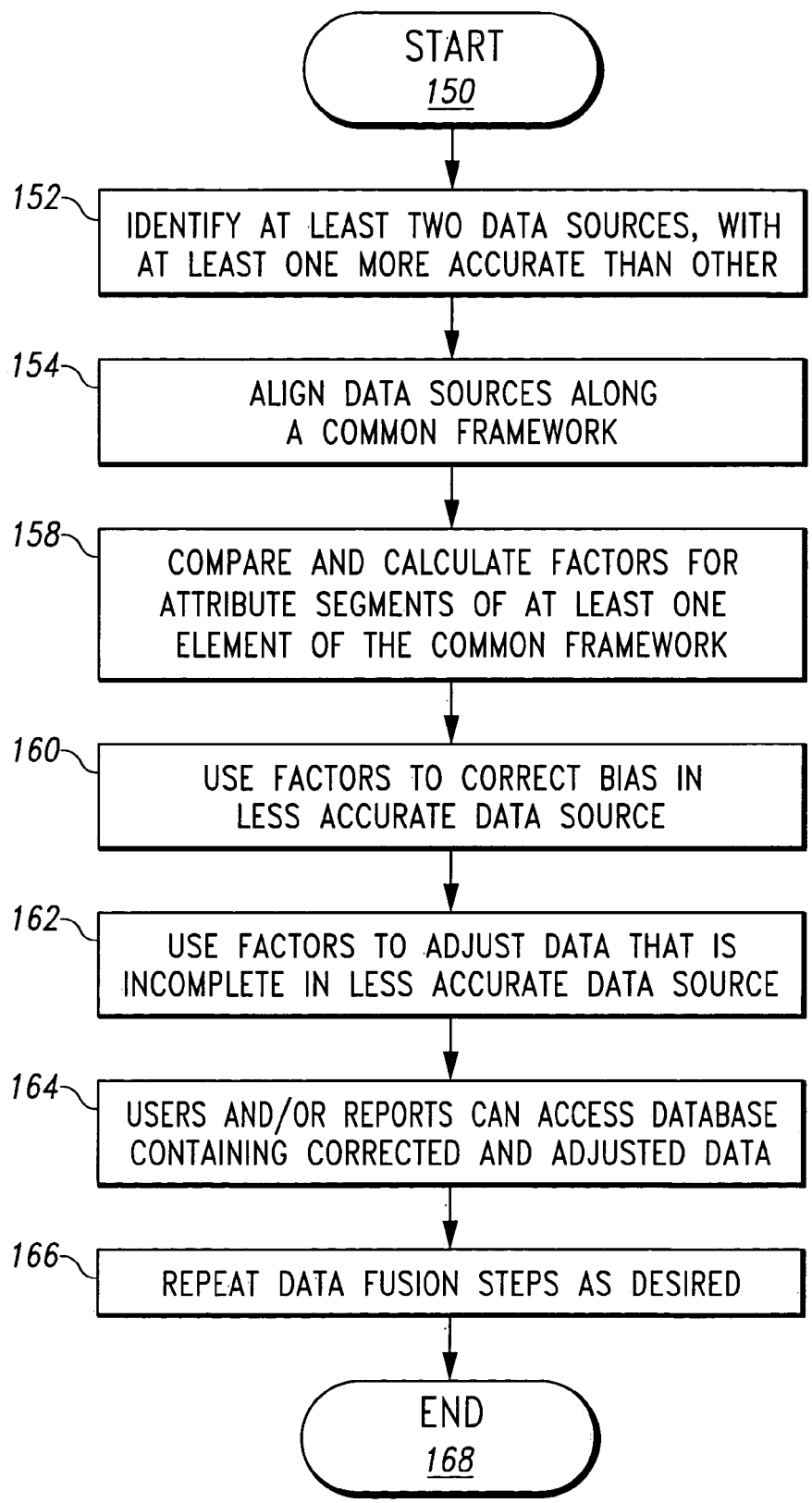
FIG. 4 is a high-level process flow diagram for the system of FIG. 1.

Referring also to FIG. 4, one embodiment for implementing system 20 is illustrated in flow chart form as procedure 150, which demonstrates a high-level process for the system of FIG. 1 and will be discussed in more detail below. FIG. 4 illustrates the high-level procedures for performing "competitive fusion" and "complementary fusion". In "competitive fusion", two or more data sources that provide overlapping measurements along at least one dimension are compared ("competed") against each other at some level of aggregation along the product, venue, and/or time dimensions. More accurate/reliable sources are used to correct less accurate/reliable sources. In "complementary fusion", relationships modeled where data sources overlap are projected to areas of the data framework in which fewer (or even a single) sources exist—enhancing the accuracy/reliability of those fewer (or single) sources even in domains where data from of the other sources upon which the models were based do not exist. The process is iterative in that the competitive and complementary fusion methodologies can be repeated at varying level of aggregation of the data framework.

In one form, procedure 150 is at least partially implemented in the operating logic of system 20. Procedure 150 begins with business logic server 24 identifying at least two data sources, with at least one data source being more accurate than another (stage 152). At least one data source (see e.g. 36 in FIGS. 1 and 64 in FIG. 2) is used as the "reference" data source and another is used as the "target" data source with the biases to be identified and quantified. In one embodiment, the reference data source is more accurate than the target data source. For purposes of the tracking of sales in retail channels, scanner-based point-of-sale (POS) data is typically a good "reference" source, due to its inherent accuracy and high level of granularity along the dimensions of time, venue, and product. Alternatively or additionally, manufacturer-supplied shipment data, especially where such data is based upon direct store delivery (DSD) information, may be utilized as a "reference" source. As yet another alternative, retailer-specific data sources (e.g., "frequent shopper" program data from loyalty cards) are also appropriate.

Various examples herein illustrate using consumer panel purchase data as the target data source to be corrected. However, the current invention can be used with other data sources, such as sample-based or survey-based data sources whose overall accuracy is limited by the presence of biases, to name a few non-limiting examples.

The product characteristics of the data sources should ideally be available at the item level, where "item" is by UPC, SKU, or another unique product identifier. In terms of the venue characteristics of the data sources, they should ideally be available at the retailer and market level, where "retailer" is a store (or chain of stores) within a particular retail channel and "market" is a geographic construct (e.g., Chicago area). In terms of the time characteristics of the data sources, they should ideally be available at the weekly level (or even daily in some cases), although monthly data (or 4-week "quad" data) or various other time frames are also acceptable. Where these levels of granularity are not possible, more aggregated levels of the product (e.g., "brand"), venue (e.g., "food" or "mass" channel for retailer and/or "region" or "total U.S." for market), and/or time (e.g., quarterly or annual data) dimensions may be used.

After the data sources have been identified (stage 152), they are next aligned along a common framework (stage 154), such as along the item, venue, and/or time dimensions.

Depending upon the characteristics (and quality) of the data sources, some aggregation along these dimensions may be required in order for the alignment to be possible. For example, UPC-level POS data may need to be aggregated at the SKU or even brand level in order to be aligned with data from other sources (particularly in the cases in which venue-specific UPCs are involved). Similarly, store-level data may need to be aggregated at the local market or even regional level in order to be aligned with consumer panel purchase data. Finally, weekly (or even daily) POS data may need to be aggregated at the 4-week quad level in order to be aligned with shipment/delivery data. Various other arrangements for aligning the data along a common framework are also possible.

In one embodiment, the item structure is provided by a multiple-level hierarchy, in which UPCs are the lowest level and are aggregated along category-related characteristics. Venue structure is provided along both geographical and channel dimensions, with FIPS-code-level transactions being aligned along market and regions and store locations being part of a sub-chain, chain, and parent store hierarchy. Time structure is presently provided at the weekly level at the lowest level of aggregation, with daily data being aggregated at the weekly level before placement into the structure, although a daily data compatible structure or other variation is also possible.

As a result of aligning the data sources along a common framework (stage 154), overlapping attribute segments of at least one dimension are available to use for data comparison and correction. Certain attributes associated with the data sources are identified along which more detailed comparisons may be made. In one embodiment, product attributes are available in from reference data 35 of database 34. For example, one or more pieces of information from product identifier 36a, attributes 36b, and dictionary 36c references can be used to access or modify attributes, attribute hierarchies, and mappings. These attributes represent category-specific dimensions along which products in that category may be characterized (e.g., diet vs. regular in carbonated soft drinks, active ingredient in internal analgesics, product size in most categories). The term attribute used herein is meant in the generic sense to cover various types of descriptors.

Business logic server 24 compares the data sources and calculates factors for the attributes of at least one element of the common framework (stage 158). Each segment of a given attribute will have its own factor, as described in detail herein. The presence of attribute-related bias may be identified by comparison of the data sources. In the examples illustrated herein, volumetric comparisons are made (e.g., equivalent units); however, various other measures (e.g., dollar sales, actual units) could also be utilized, as long as the same type of measure is being used for the comparison. For example, it would not be useful to compare dollar sales to actual units, but it would be useful to compare dollars to dollars. The comparison itself is between the value of the target data source (e.g., projected panel volume) and that of the reference data source (e.g., POS data). This comparison can be by way of two-sample inference, regression analysis, or other statistical tests appropriate for determining whether any differences between the two data sources are associated with the attributes along which they have been characterized at a statistically significant level. Where such differences (biases) are identified, they are quantified, and factors are calculated for use in bias correction/adjustment.

The factors are used to correct bias in the less accurate data source (stage 160), which in this example is consumer panel data. By using the factors to correct the bias in the less accurate "target" data source, the effect of these biases is reduced or eliminated. These biases can be corrected by adjusting the raw data, or by way of post-adjustment.

In "complementary fusion", the factors are also used to supplement the data that is incomplete in the less complete data source (stage 162), such as consumer panel data. Incomplete data is used in a general sense to mean that less data was provided than desired or that the data is less accurate than desired, to name a few non-limiting examples. Where highly accurate data (e.g. POS data) is not provided, less accurate data (e.g. panel data) becomes more important to analyze and correct. Relationships modeled where data sources overlap are projected to areas of the data framework in which fewer (or even a single) sources exist, enhancing the accuracy and reliability of those fewer (or single) sources even in domains where data from of the other sources upon which the models were based do not exist.

Users and/or reports can access database 34 from one of client workstations 30 to view/analyze the corrected and adjusted data (stage 164). Users and/or reports can also access database 34 from one of client workstations 30 to view and/or modify settings used by system 20 to make data corrections. The steps are repeated as desired (stage 166). The process then ends at stage 168.

Figure 5A:
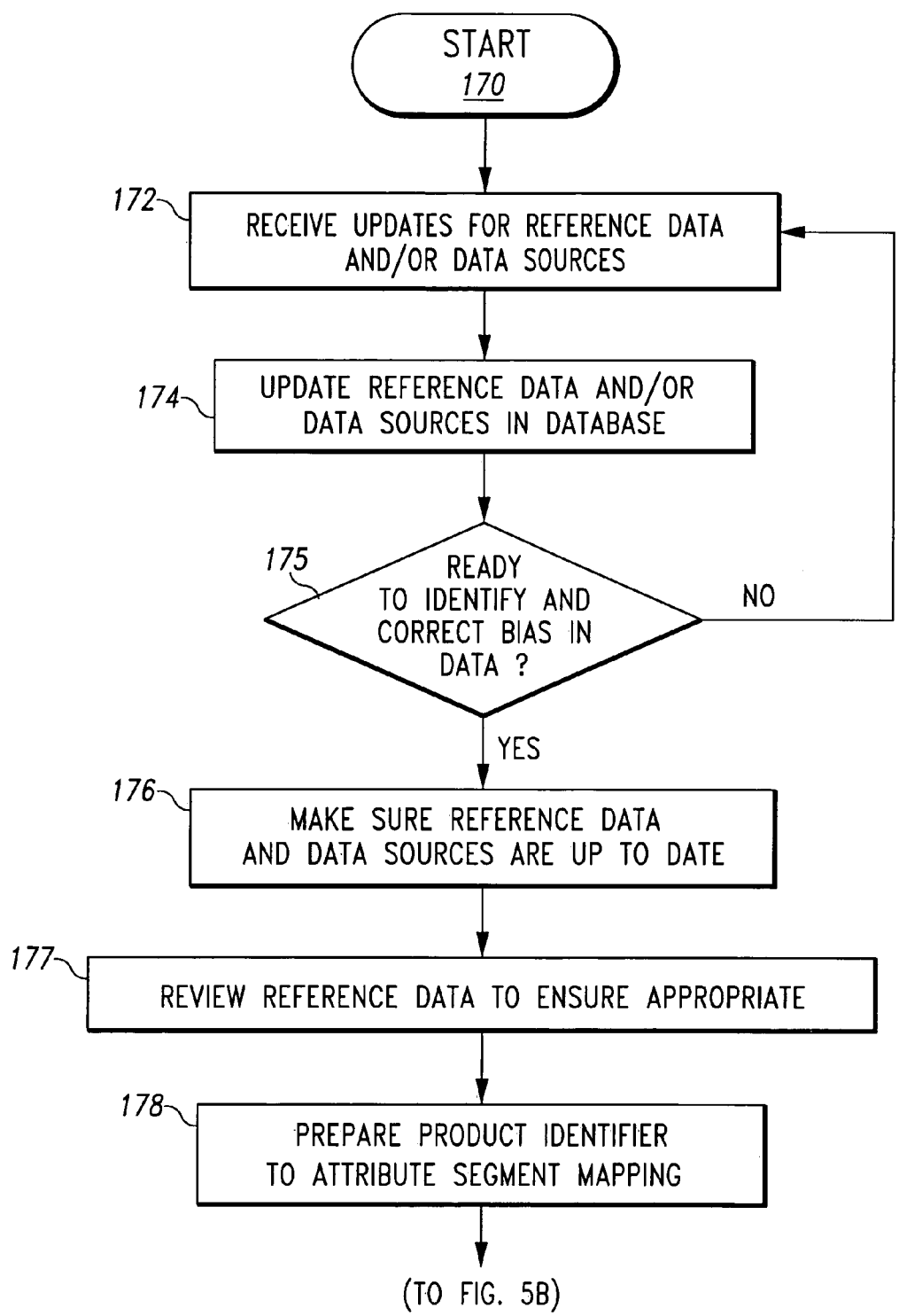
FIG. 5A is a first part process flow diagram for the system of FIG. 1 demonstrating the stages involved in performing competitive and complementary fusion.
Figure 5B:
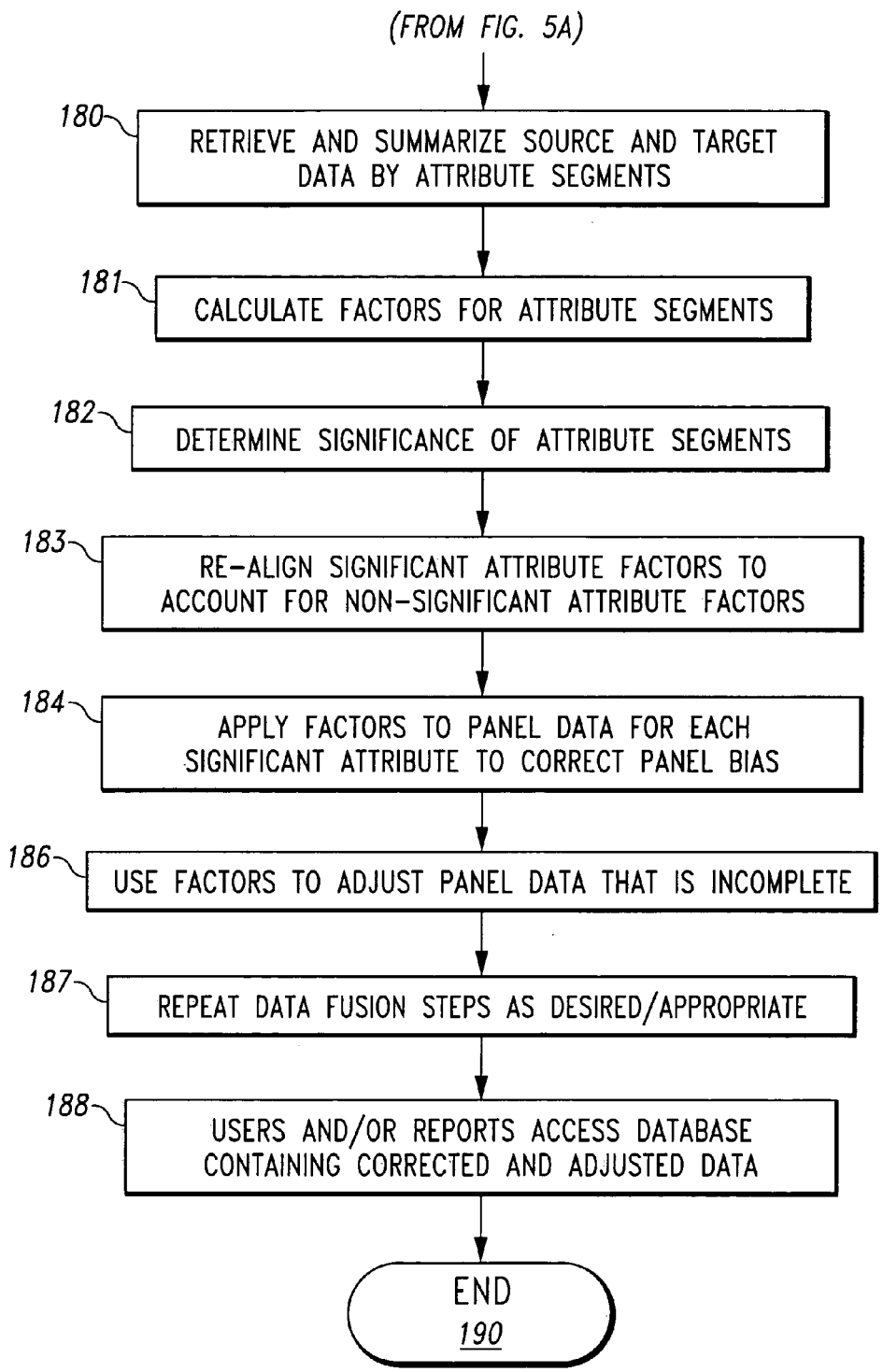
FIG. 5B is a second part process flow diagram for the system of FIG. 1 demonstrating the stages involved in performing competitive and complementary fusion.

FIGS. 5A-5B are first and second parts of a process flow diagram for the system of FIG. 1 demonstrating the stages involved in performing competitive and complementary fusion using POS and panel data as the data sources. While in this and other figures, the first data source (the "source" data source) is described as being POS data and the second data source (the "target" data source) is described as being panel data, it will be appreciated that the system and methodologies can be used with other data sources as appropriate. In one form, procedure 170 is at least partially implemented in the operating logic of system 20. Procedure 170 begins in FIG. 5A with receiving updates for reference data 35 and/or data sources 38 on a periodic basis (stage 172).

In one embodiment, a parameter specification for the number of weeks used in calculating the factors is thirteen, and the minimum week range included in database 34 is then set to be thirteen weeks prior to the update week. Database 34 may be built and maintained using various data sources and can include various types of data, as would occur to one of ordinary skill in the art. In one embodiment, system 20 supports the option to pull the desired period (e.g. all thirteen weeks) of the data sources 38, append the recent period (e.g. four weeks) needed since the last factor update to the existing database 34, and/or be able to recreate the data a week at a time. In such a scenario, for space conservation, the system can optionally drop the same number of weeks from the start week of database 34 as were appended to the end week. For example, if the option was chosen to append the four weeks needed since the last factor update, the system should drop the four oldest weeks from the existing database 34 when appending the four new weeks.

The received updates to reference data 35 and/or data sources 38 are stored in database 34 (stage 174). At some point in time, such as on a scheduled or as-requested basis, the system determines that data adjustments should be made to correct bias (decision point 175). Application business logic 33 ensures reference data 35 and data sources 38 are up to date, and if not, updates them accordingly (stage 176). Optionally, reference data 35 is reviewed to ensure that the default attributes for the current category will be appropriate for the client or scenario, and adjustments are made to reference data 35 as appropriate (stage 177). As one non-limiting example, attribute segments may be reviewed and translated to more succinct segmentations that better classify the product identifiers. Other variations are also possible.

A product-identifier-to-attribute-segment mapping is prepared for the product identifiers (e.g. UPC's) (stage 178). If the attributes are determined to be irrelevant, they can be removed from further consideration in this process. The attribute table 36b is a reference table that maps each product identifier 36a to a set of attribute variables. While UPC's are described as a common product identifier, other identifiers could also be used. For example, not every dataset has a UPC, but may have a product identifier at a higher, lower, or equivalent level. Rules are used to determine supportable attribute segments and relevant attributes. In one embodiment, if segment assignment is missing then the UPC is assigned to a new segment "not supportable." All segments with less than a 5% share are assigned to "not supportable." Furthermore, in one embodiment, if the final "not supportable" category accounts for >50% of the category share, then the attribute is designated as "irrelevant." Other ways for determining relevance can also be used, or relevance can simply be ignored. Stage 178 can be repeated to arrive at the final level of segments to use (rolled-up or drilled-down) as appropriate.

Continuing with FIG. 5B, source (e.g. POS) and target (e.g. panel) data 38 are retrieved from database 34 and summarized by attribute segments (stage 180). Factors are calculated for attribute segments (stage 181). The significance of the attribute segments is determined (stage 182). If any non-significant factors are determined, the significant attribute factors can be re-aligned (stage 183). The factors for each attribute segment are applied to the target (panel) data to correct bias (stage 184). The factors are also applied to the target (panel) data to correct data that is incomplete (e.g. less available) (stage 186). The competitive and/or complementary data fusion steps can be repeated as desired or appropriate (stage 187). Users and/or reports can access database 34 from one of client workstations 30 to view/analyze the corrected and adjusted data (stage 188). The procedure 170 then ends at stage 190. FIGS. 6-10 illustrate the competitive and complementary fusion stages in further detail.

Figure 6A:
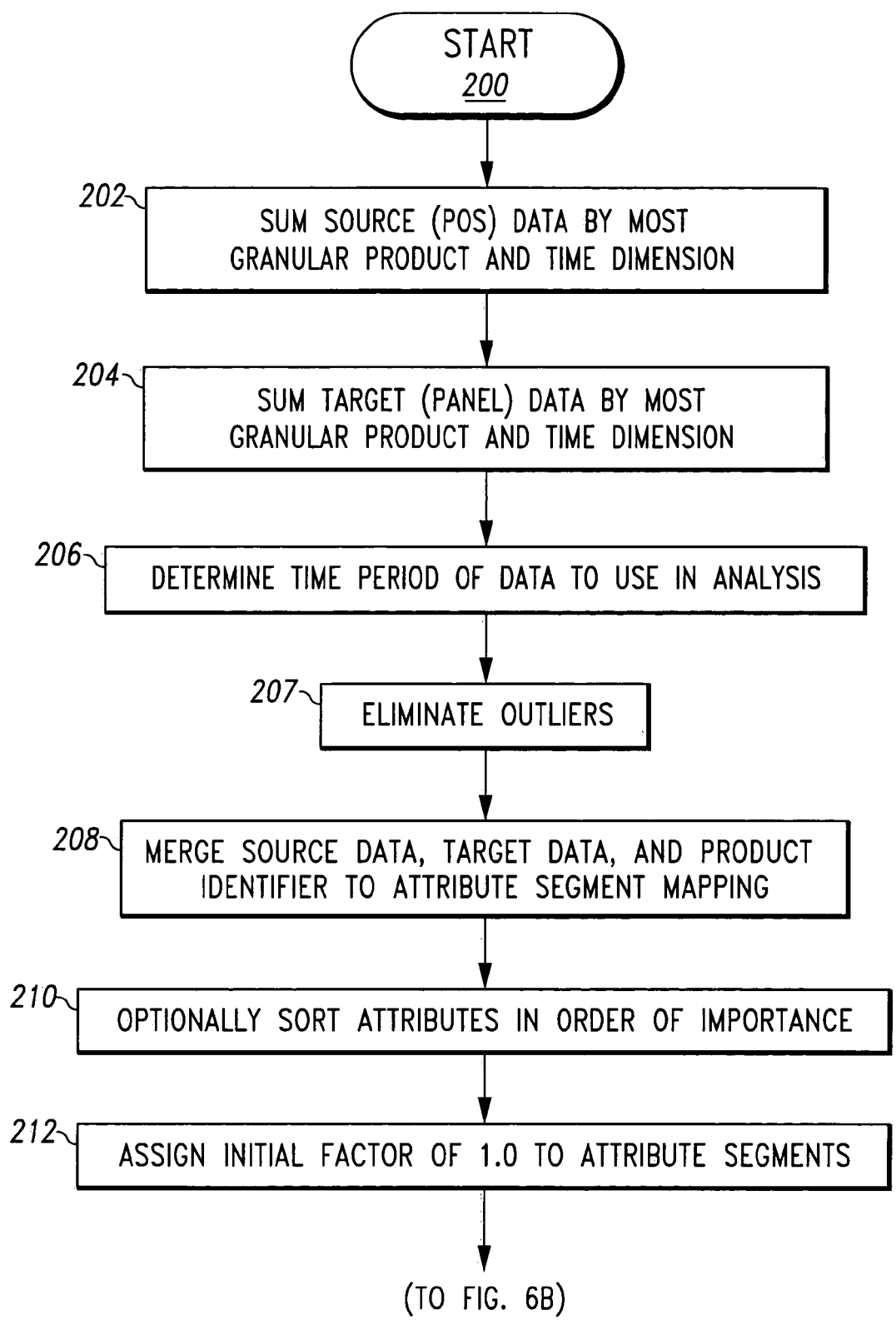
FIG. 6A is a first part process flow diagram for the system of FIG. 1 demonstrating a preferred process for calculating and applying factors in competitive fusion.
Figure 6B:
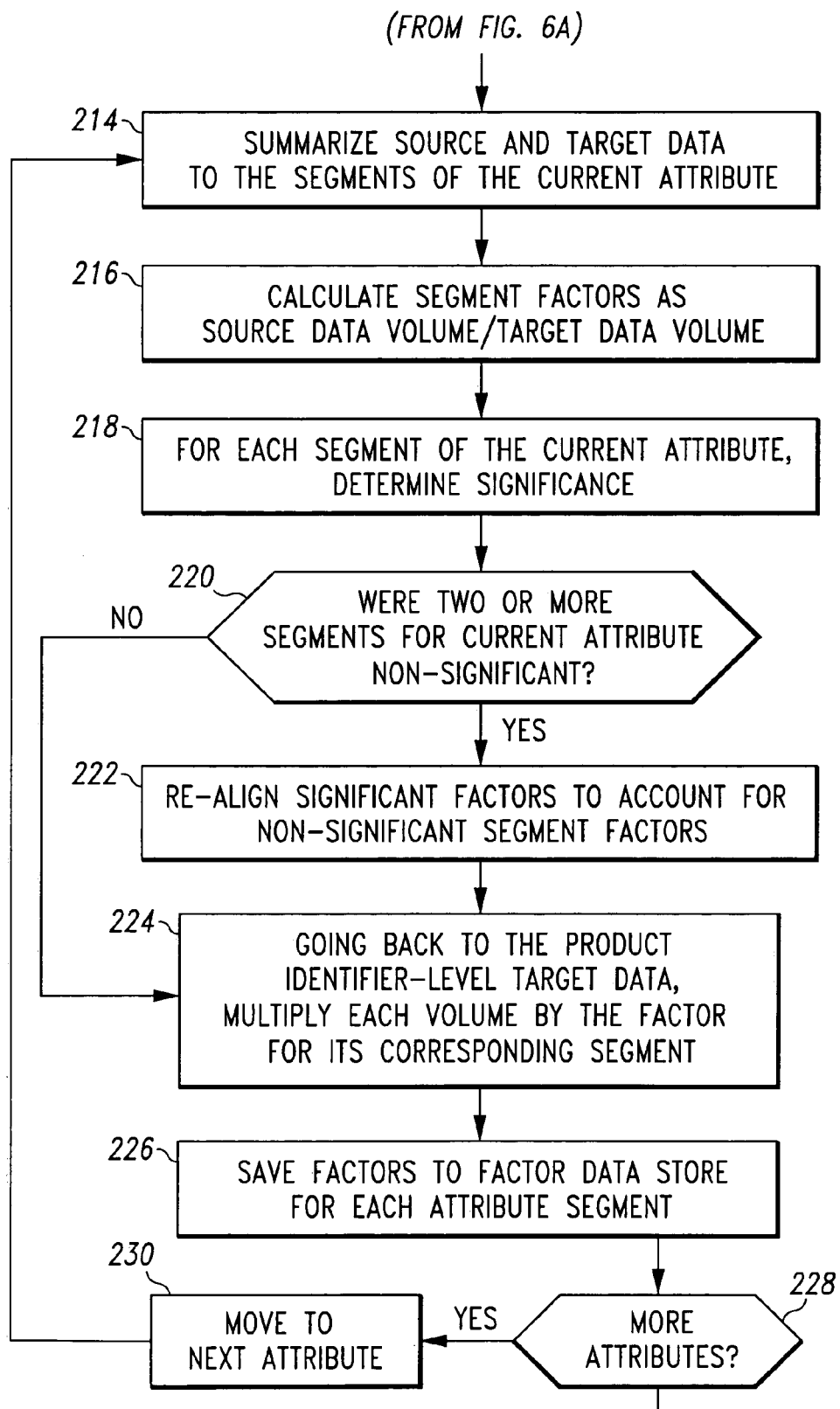
FIG. 6B is a second part process flow diagram for the system of FIG. 1 demonstrating a preferred process for calculating and applying factors in competitive fusion.
Figure 6C:
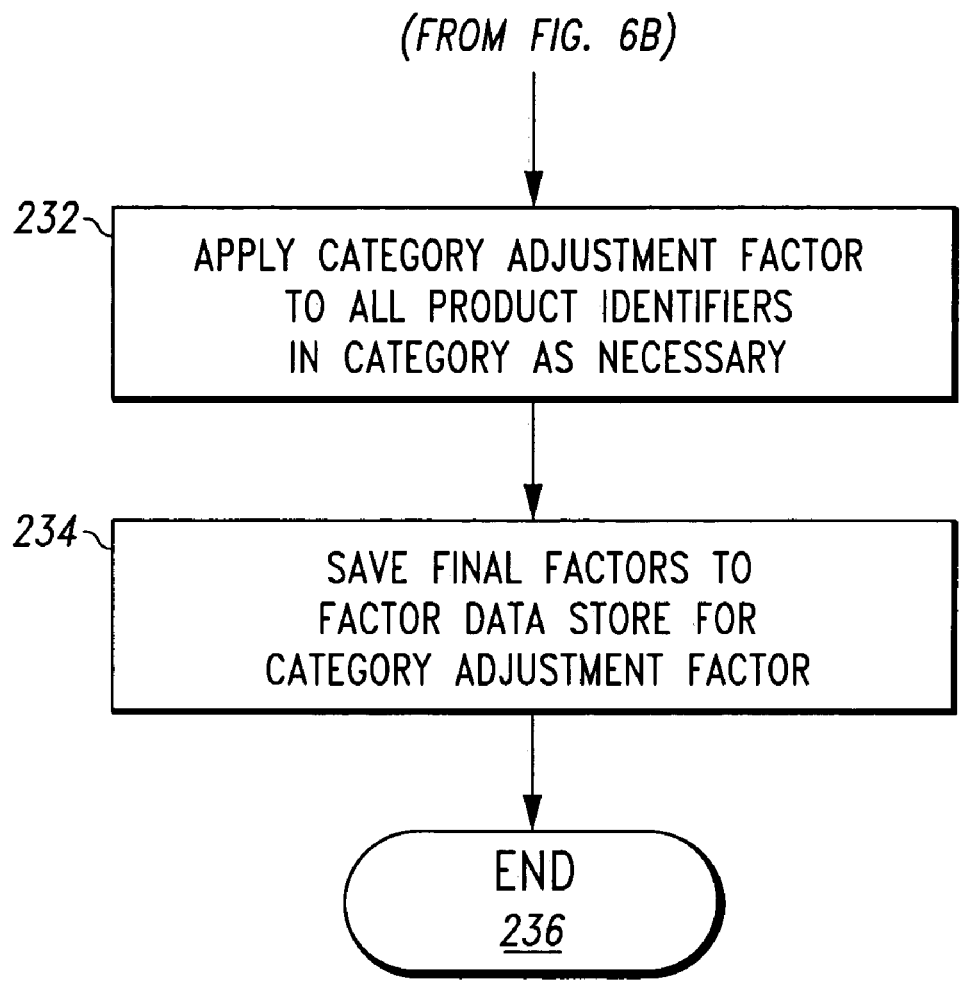
FIG. 6C is a third part process flow diagram for the system of FIG. 1 demonstrating a preferred process for calculating and applying factors in competitive fusion.

FIGS. 6A-6C are first, second, and third parts of a process flow diagram for the system of FIG. 1 demonstrating a preferred process for iteratively calculating and applying factors in competitive fusion. In one form, procedure 200 is at least partially implemented in the operating logic of system 20. Procedure 200 begins on FIG. 6A with summing source (POS) data by the most granular product and time dimension (e.g. UPC) (stage 202) and summing target (panel) data by the most granular product and time dimension (e.g. UPC) (stage 204). In one embodiment, they are both summed to weekly (e.g. 52) totals. Business logic server 24 determines the period of time to use in the analysis (stage 206), such as to use all of the weekly totals summed in the prior step or to use only part of the weekly totals that cover a desired time period, such as the most recent 13 weeks, to name a few examples. Outliers are also eliminated (stage 207) at this point or another appropriate point before final calculations. For example, in one embodiment, although thirteen weeks are contained in the dataset, only 11 weeks are actually used in calculations. Research indicates that panel volume is extremely vulnerable to outliers. To minimize the potential impact of outliers, the week with the lowest coverage and the week with the highest coverage are eliminated from further use in calculations for the current update. In one embodiment, although the outlier weeks are eliminated from further use in calculations for the current update, they are not removed from the dataset as they may be used in subsequent updates. Business logic server 24 then merges the source (POS) data, target (panel) data, and product identifier to attribute segment mapping reference data (stage 208). Attributes can optionally be sorted in order by importance (stage 210). In one embodiment, the least important is first and the most important is last. If factors for the most important attribute segments are the last ones applied, it usually has the most significant mathematical effect because no lesser important attribute segment factor will be applied after that last calculation to further skew the results.

An initial factor of 1.0 is assigned to all attribute segment (stage 212). Continuing with FIG. 6B, source (POS) and target (panel) data are then summarized for the segments of the current attribute (stage 214). A factor is calculated for each attribute segment of the current attribute as source data volume divided by target data volume (stage 216). Other mathematical variations could also be used. For each segment of the current attribute, determine whether the attribute segment is significant (stage 218). In one embodiment, shares are calculated for the attribute segments, such as by dividing the Calculation Period Segment Total U.S. POS volume by the Calculation Period Category Total U.S. POS volume. Significance is then determined by first analyzing a confidence interval (CI) for each share to determine if there is overlap between the POS share CI and the panel share CI. If there is overlap, then the difference between source and target shares is not significant and the attribute segment will be designated as "nonsignificant." Other ways for determining significance can also be used, or significance can be assumed.

In one embodiment, if two or more segments for the current attribute were nonsignificant (stage 220), then the significant factors (that remain) will need to be re-aligned to account for non-significant segment factors being removed (stage 222). At the product identifier-level target (POS) data, each volume is multiplied by the factor for the corresponding segment (stage 224). Again, other mathematical variations could also be used. The factors for each attribute segment are then saved to factor data store 39 of database 34 (stage 226). If another attribute is present (decision point 228), the next attribute is made the current attribute (stage 230) and stages 214-226 are repeated. These stages are repeated until all attributes are processed. Continuing with FIG. 6C, a category adjustment factor is applied to all product identifiers as necessary (stage 232) to adjust for the level of coverage. In one embodiment, the use of a category adjustment factor depends on the type of measure being used. For example, where volume is used, coverage adjustments may not be necessary, but where shares are used, further coverage adjustments may be necessary. Any final factors for the category adjustment factor are saved to the factor data store 39 of database 34 (stage 234). The process 200 then ends at stage 236.

Figure 7A:
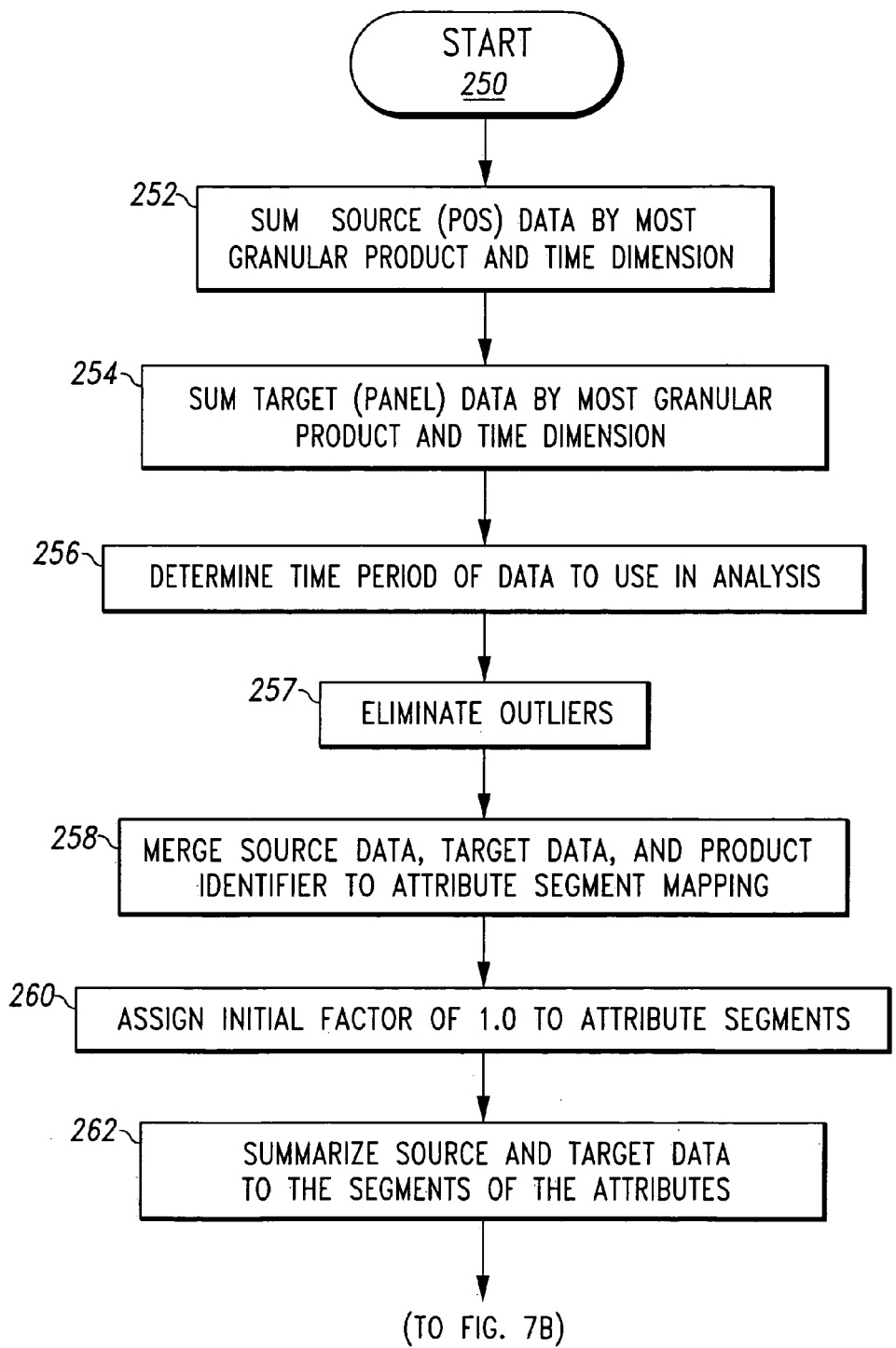
FIG. 7A is a first part process flow diagram for the system of FIG. 1 demonstrating an alternate process for calculating and applying factors in competitive fusion.

FIGS. 7A-&C are first, second, and third parts of a process flow diagram for the system of FIG. 1 demonstrating an alternate process for calculating and applying factors in competitive fusion. In one form, procedure 250 is at least partially implemented in the operating logic of system 20. Procedure 250 begins on FIG. 7A with summing the more reliable (source) data source (e.g., POS data) by the most granular product and time dimension (e.g. UPC) (stage 252) and summing the less accurate (target) data source (e.g., panel data) by the most granular product and time dimension (stage 254). Business logic server 24 determines the period of time to use in the analysis (stage 256) and eliminates outliers (stage 257), as discussed in FIG. 6. Source data, target data, and product identifiers to attribute segment mapping data are merged (stage 258). An initial factor of 1.0 is assigned to each attribute segment (stage 260). Source and target data are summarized to the segments for all attributes (stage 262).

Figure 7B:
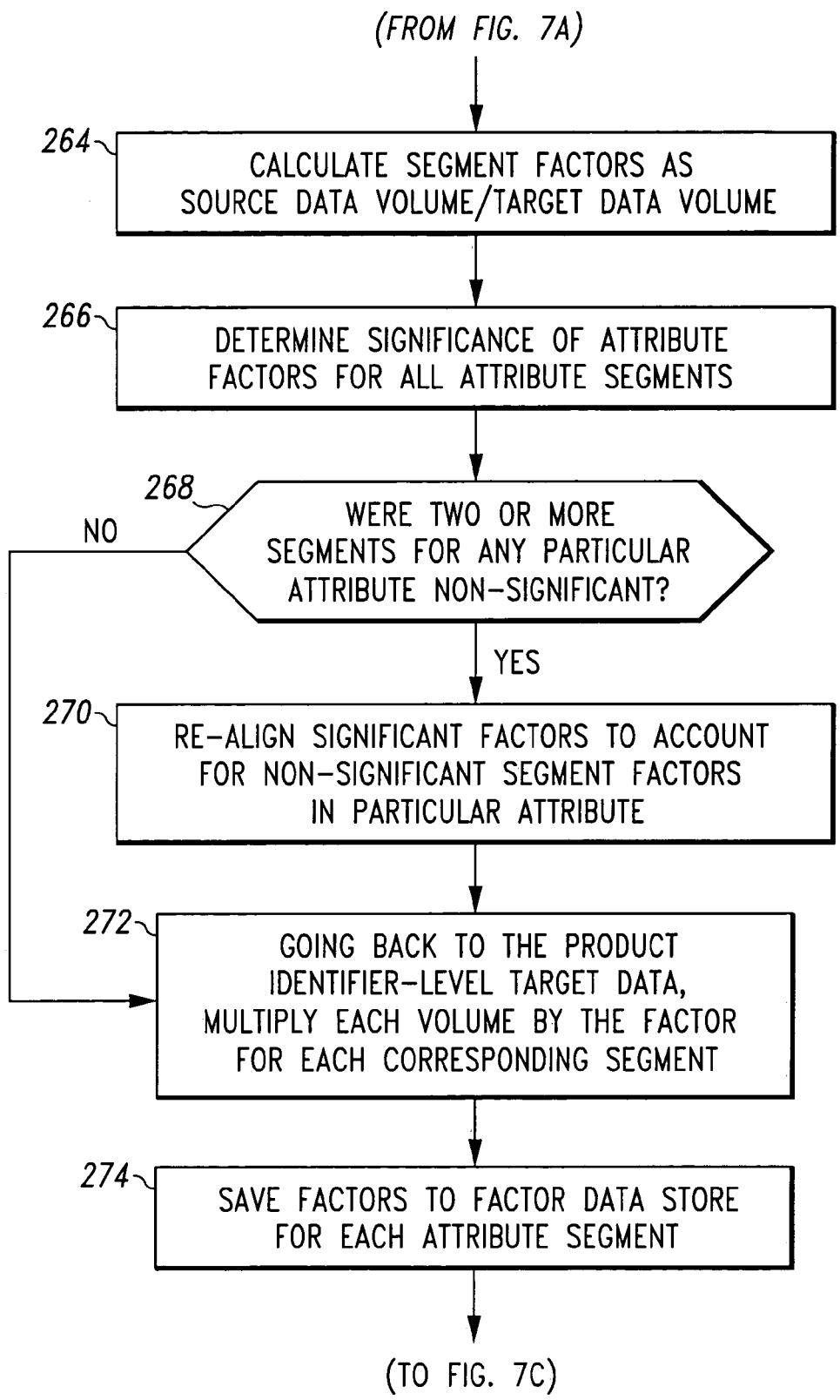
FIG. 7B is a second part process flow diagram for the system of FIG. 1 demonstrating an alternate process for calculating and applying factors in competitive fusion.

Continuing with FIG. 7B, factors are calculated for each attribute segment as source volume divided by target volume (stage 264). Business logic server 24 determines whether the attribute segment is significant (stage 266), as described in FIG. 6. Where two or more segments for any particular attribute are insignificant (decision point 268), then the significant factors are re-aligned to account for the elimination of the insignificant segment factors in the particular attribute (stage 270). At the product identifier-level target data, each volume is multiplied by the factor for each corresponding segment (stage 272). In other words, all of the factors applicable to the volume are applied simultaneously, as opposed to iteratively as shown in FIG. 6. The factors are then saved to factor data store 39 for each attribute segment (stage 274).

Figure 7C:
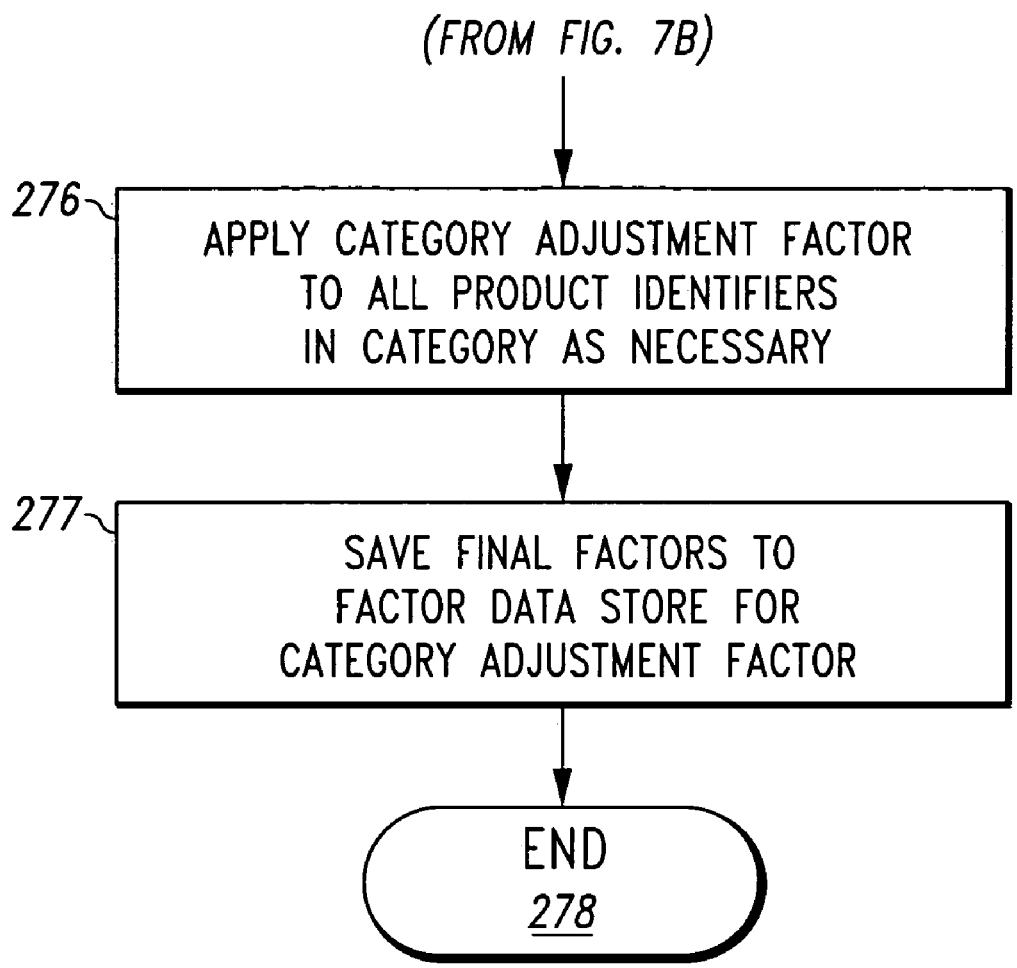
FIG. 7C is a third part process flow diagram for the system of FIG. 1 demonstrating an alternate process for calculating and applying factors in competitive fusion.

Continuing with FIG. 7C, a category adjustment factor is applied to all product identifiers as necessary (stage 276), as described in FIG. 6. The final factors for the category adjustment factor are saved to the factor data store 39 of database 34 (stage 277). The procedure 250 then ends at stage 278. Procedure 250 should only be used in the appropriate circumstances, such as when the attributes are not affected by each other and iteration is not needed for greater accuracy, to name one example. If attributes are affected by each other and procedure 250 is used instead of the iterative procedure of FIG. 6, then the results will be mathematically different, with the procedure of FIG. 6 producing a more accurate result.

Figure 8:
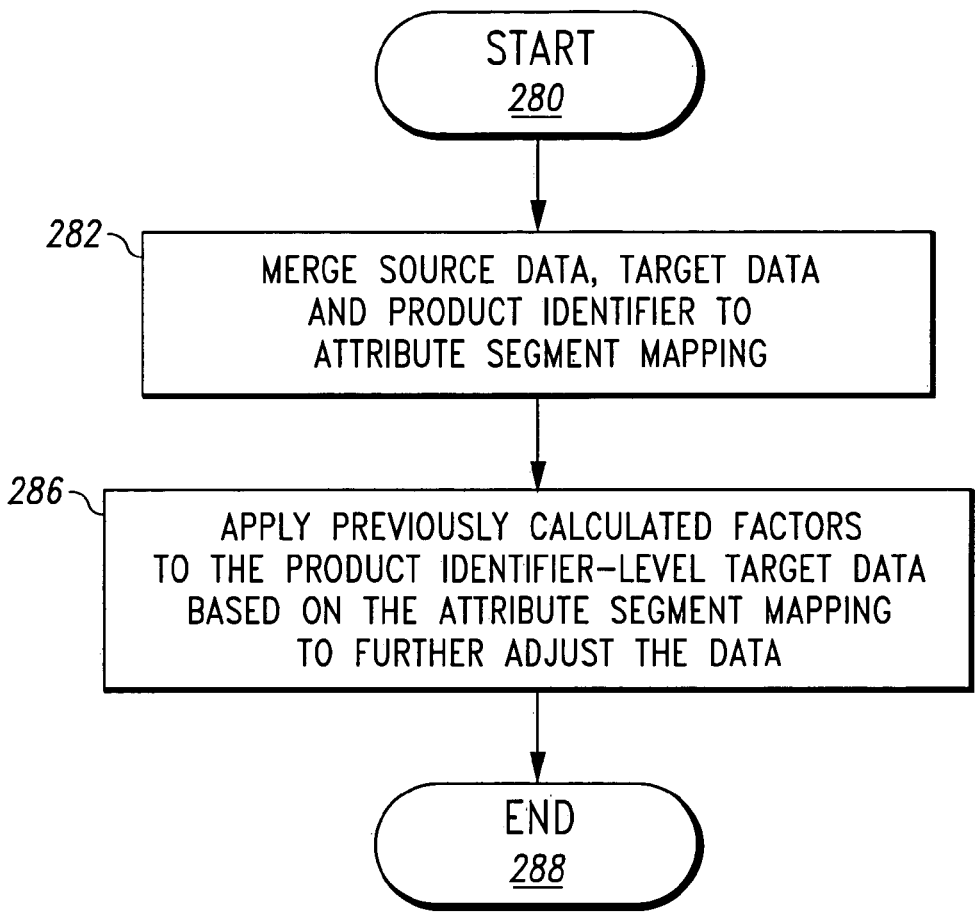
FIG. 8 is a process flow diagram for the system of FIG. 1 demonstrating the stages involved in performing complementary fusion.

FIG. 8 is a process flow diagram for the system of FIG. 1 demonstrating the stages involved in performing complementary fusion. In one form, procedure 280 is at least partially implemented in the operating logic of system 20. Procedure 280 begins with merging source data, target data, and product identifier data to attribute segment mapping data (stage 282). The factors previously calculated in accordance with FIG. 6 or FIG. 7 are applied to the product identifier-level target data based on the attribute segment mapping to correct the data for incompleteness (e.g. less data than desired) (stage 286). The target data elements that are corrected in this process can be the same, different, or overlapping from the target data that was used to help calculate the factors. The procedure 280 then ends at stage 288.

Figure 9:
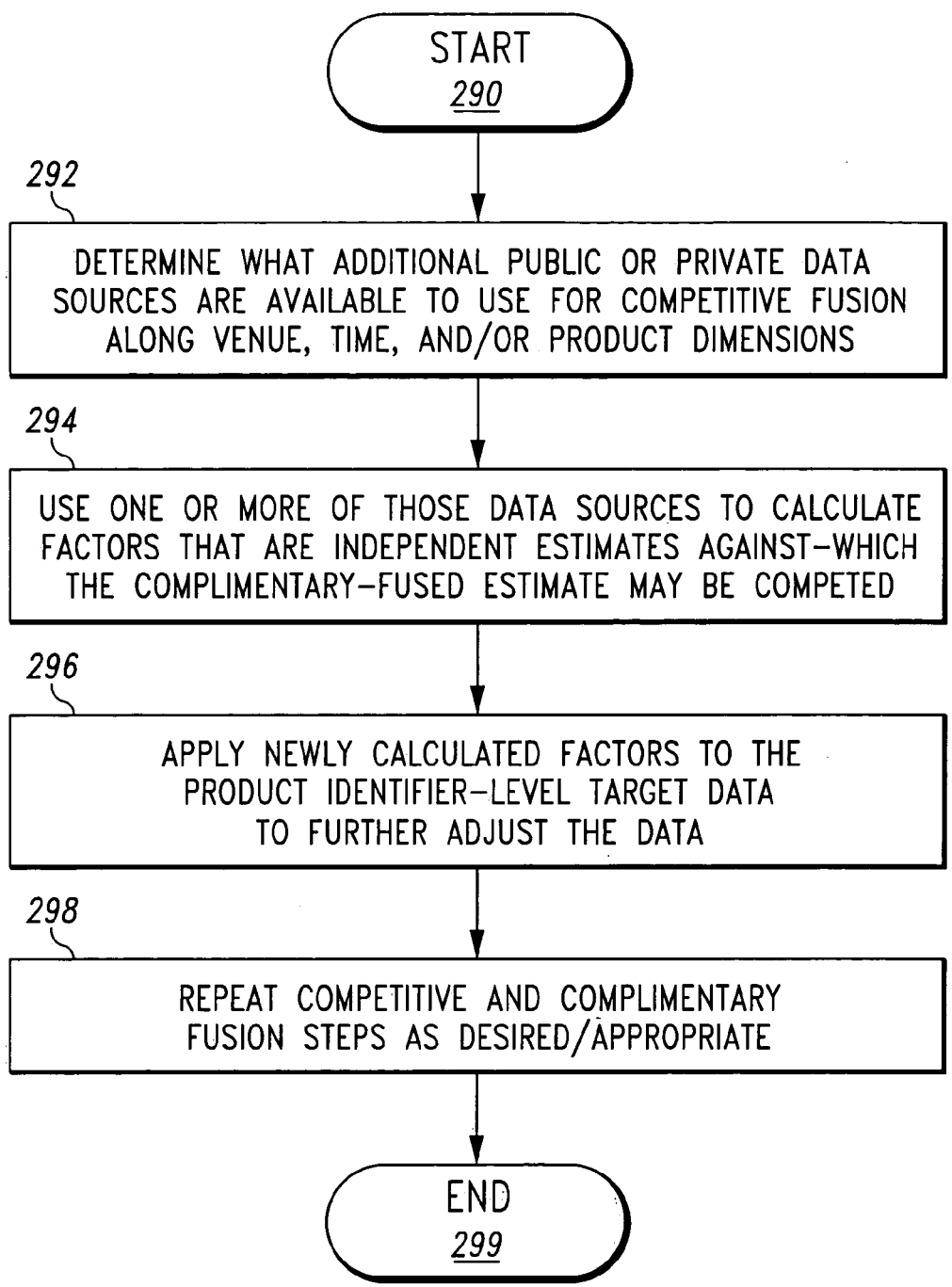
FIG. 9 is a process flow diagram for the system of FIG. 1 demonstrating the stages involved in iteratively performing competitive and complementary fusion steps.

FIG. 9 is a process flow diagram for the system of FIG. 1 demonstrating the stages involved in performing repeating competitive and complementary fusion steps multiple times. In one form, procedure 290 is at least partially implemented in the operating logic of system 20. Procedure 290 begins with determining what additional public or private data sources are available to use for competitive fusion along venue, time, and/or product dimensions (stage 292). Using one or more of those data sources, additional factors are calculated that are independent estimates against which the complementary-fused estimate may be competed (stage 294). The newly calculated factors are applied to the product identifier-level target data (e.g. POS data) to further adjust the data (stage 296). The competitive and complementary fusion steps can be repeated as desired and/or appropriate (stage 298). The procedure 290 then ends at stage 299.

Figure 10:
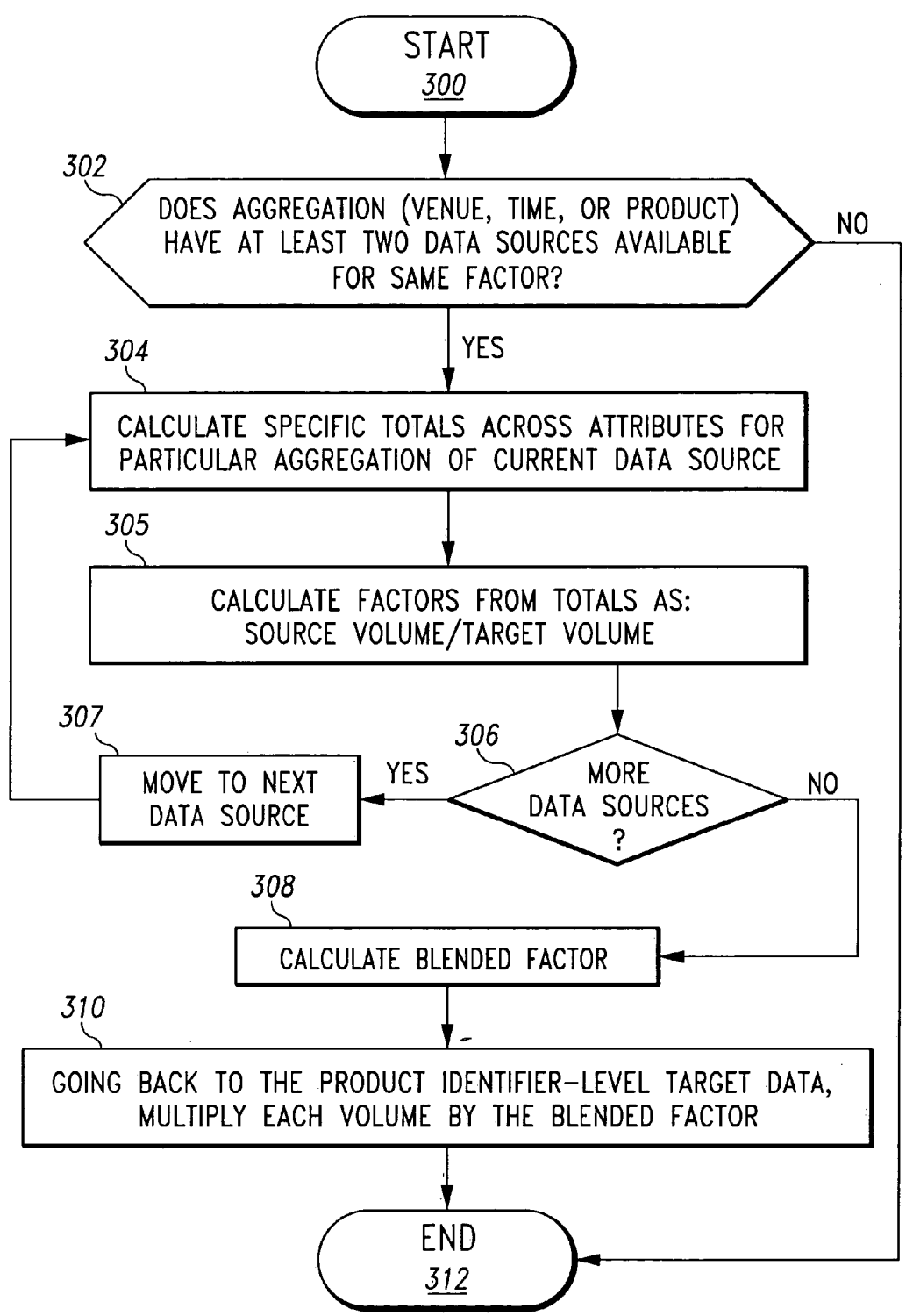
FIG. 10 is a process flow diagram for the system of FIG. 1 demonstrating the stages involved in calculating blended factors where multiple factor measures are available for the same factor.

FIG. 10 is a process flow diagram for the system of FIG. 1 demonstrating the stages involved in calculating blended factors where multiple factor measures are available for the same factor. In one form, procedure 300 is at least partially implemented in the operating logic of system 20. Procedure 300 can be used when competitive fusion is being performed and at least two data sources are available for the same factor (stage 302). For each aggregation (venue, time, or product) that has at least two factor measures, calculate specific totals are calculated across attributes (stage 304). Factors for each aggregation of the current data source are calculated by dividing source data volume by target data volume (stage 305). If there are more data sources (decision point 306), then move to the next data source (stage 307) and repeat stages 304-305. Then, calculate a blended factor (stage 308) where the more accurate source is given a higher weight and the less accurate source is given a lower weight. One simple way of calculating a blended factor is to calculate a central tendency—e.g., mean or median—of the various factors as the overall factor. This treats all estimates as of equal value (reliability, accuracy, precision), which in reality may or may not be the case. In a preferred embodiment, the "blended factor" uses an "inverse-variance-weighted" method (see 444 on FIG. 19 as an example). This name originates from the fact that more "reliable" estimates—i.e., those with more precision and, thus, less variability—are given more weight than those that are less "reliable" (more variable). Once the blended estimate has been calculated, multiply each volume of the product identifier-level target data by the blended factor (stage 310). The procedure 300 then ends at stage 312.

A hypothetical example will now be described in FIGS. 11-21 to with reference to the procedures described in FIGS. 6-10. FIG. 11 is a data table illustrating hypothetical data elements that are adjusted according to the preferred embodiment competitive fusion procedure of FIG. 6. POS data 320, panel data 322, and attribute information 324 are shown in a summarized form by UPC 326. For each attribute and its corresponding segments, various steps are performed as discussed below.

Figure 12:
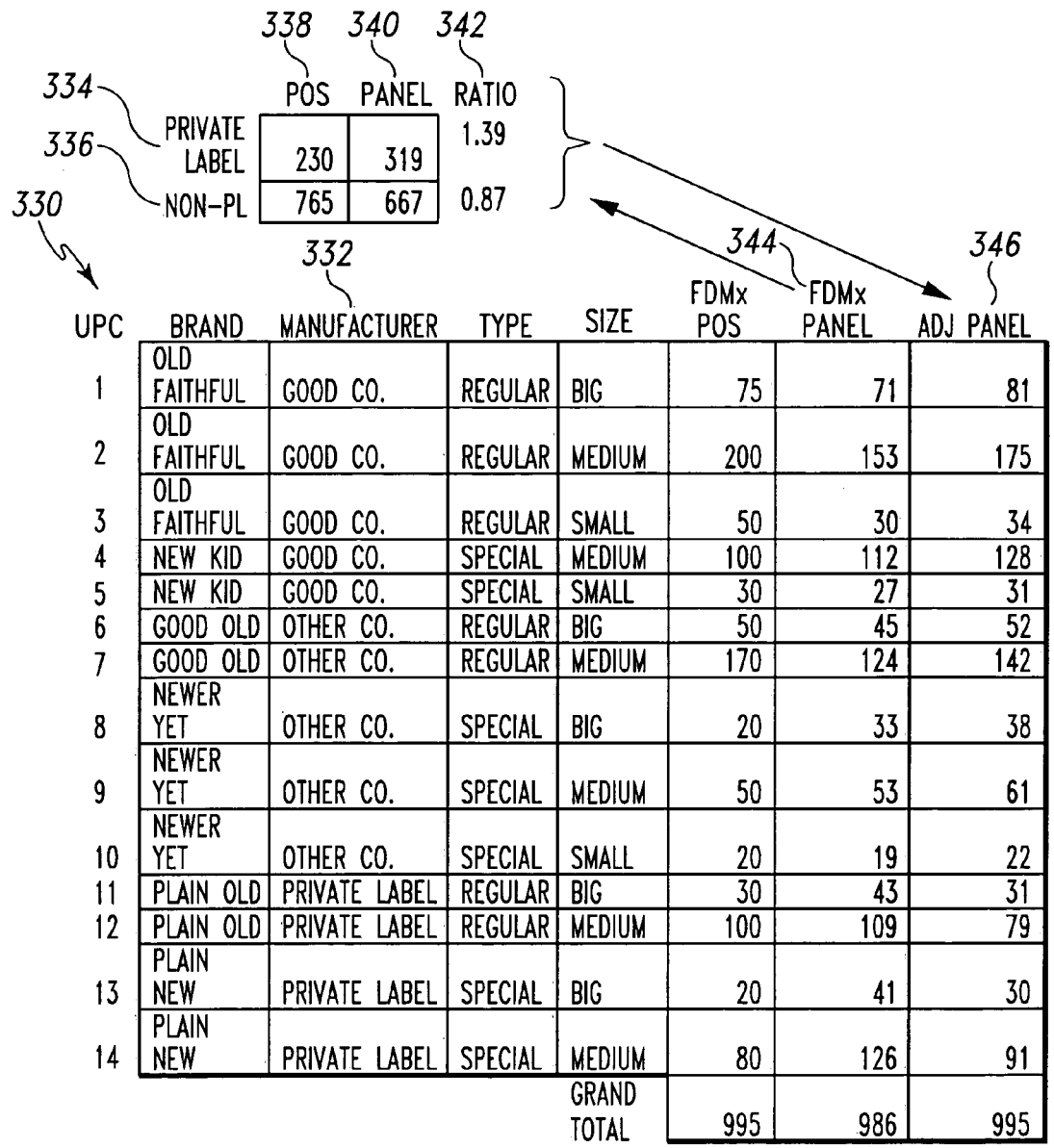
FIG. 12 is a data table illustrating hypothetical data elements that are stored in the database of FIG. 1 and are adjusted according to factors for a first attribute in accordance with the procedure of FIG. 6.

Turning to FIG. 12, the data is assumed to be relevant and the POS and panel data shown in table 330 are then summarized for the segments of the current attribute (stage 214), which in the current iteration is manufacturer 332. Private brand label summaries 334 and non-private brand label summaries 336 for POS 338 and panel data 340 are calculated from table 330 as illustrated. A factor 342 for each attribute segment of the current attribute, in this case private label manufacturer 334 and non-private label manufacturer 336 segments, is calculated as POS volume 338 divided by panel volume 340 (stage 216). Business logic server 24 determines whether the current attribute segment is significant (stage 218). For purposes of illustrating the current example, all attribute segments are also assumed significant. At the UPC level panel data, each panel volume 344 is multiplied by the factor 342 for its corresponding segment (stage 224) to arrive at an adjusted panel value 346. Factors 342 are saved to the factor data store 39 of database 34 (stage 226).

As shown in FIGS. 13 and 14, stages 214 to 226 repeat for each attribute, with previously adjusted data being used in the calculation. FIG. 13 illustrates data elements being adjusted according to factors calculated for a second attribute in accordance with the procedure of FIG. 6. The POS and panel data shown in table 350 are then summarized for the segments of the current attribute (stage 214), which in the current iteration is type 352. Summaries for regular type 354 and special type 356 for POS 358 and panel data 360 are calculated from table 350 as illustrated. A factor 362 for each attribute segment of the current attribute, in this case regular type 354 and special type 356 segments, is calculated as POS Volume 358 divided by panel volume 360 (stage 216). At the UPC level panel data, the previously adjusted panel volume 364 is multiplied by the factor 362 for its corresponding segment (stage 224) to arrive at yet another adjusted panel value 366. Factors 362 are saved to the factor data store 39 of database 34 (stage 226).

FIG. 14 illustrates data elements being adjusted according to factors calculated for a third attribute in accordance with the procedure of FIG. 6. The POS and panel data shown in table 370 are then summarized for the segments of the current attribute (stage 214), which in the current iteration is size 372. Summaries for size big 374, size medium 375, and size small 376 for POS 378 and panel data 380 are calculated from table 370 as illustrated. A factor 382 for each attribute segment of the current attribute, in this case size big 374, medium 375, and small 376 segments, is calculated as POS Volume 378 divided by panel volume 380 (stage 216). At the UPC level panel data, each previously adjusted panel volume 384 is multiplied by the factor 382 for its corresponding segment (stage 224) to arrive at yet another adjusted panel value 386. Factors 382 are saved to the factor data store 39 of database 34 (stage 226). After processing all attributes, the final factors are saved to the factor data store 39 of database 34 (stage 234). The process then ends at stage 236.

FIGS. 15 and 16 illustrate data elements being adjusted according to factors calculated according to an alternative embodiment competitive fusion process in accordance with the procedure of FIG. 7. Business logic server 24 determines the period of time to use in the analysis (stage 256), and merges POS, panel, and attribute information by UPC as shown in table 390 (stage 258). POS data 392 and panel data 394 are summarized for all attribute segments (stage 262), in this case by manufacturer 396, type 398, and size 400. As shown in FIG. 16, factors for each attribute segment 402 are calculated as each respective POS volume 404 divided by each respective panel volume 406 (stage 264). Each panel volume 407 is multiplied by the factors 408a-408c appropriate for its corresponding segment (stage 272) to calculate an adjusted panel value 410. The process then ends at stage 278.

FIG. 17 is a data table illustrating hypothetical data elements by retailer that are stored in the database of FIG. 1 and used in accordance with the complementary fusion procedure of FIG. 8. POS, panel and attribute information are merged by UPC (stage 282) for multiple retailers, as shown in table 420. Client shipment data 424, another data source available, is also merged by UPC. Shares are calculated for POS data 420a-420b and panel data 422a-422c for the segments of each attribute (stage 284). As shown in FIG. 18, the previously calculated factors 430a-430c (408a-408c in FIG. 16) are applied to the UPC level panel data 432a-432c to further adjust the data to correct for incompleteness (stage 286) and arrive at an adjusted panel value 434a-434c. The complementary fusion process then ends at stage 288.

FIGS. 19 and 20 illustrate performing another iteration of competitive fusion, including calculating blended factors, as described in the procedures of FIG. 9 and FIG. 10. Additional public or private data sources are identified as available to use for competitive fusion (stage 292). As shown in table 438, channel specific totals 440a-440f across attributes have been identified for use in competitive fusion. In addition to POS and Panel totals for retailers 1 and 2 (440a-440d), client shipment total 440e and panel total 440f can also be used for comparison. Using these totals 440a-440f, additional factors 442 have been calculated that are independent estimates against which the complementary-fused data from FIG. 18 may be competed (stage 294). A blended factor 444 has been calculated since multiple data sources were available for the same factor (stages 302-308 in FIG. 10). As shown in FIGS. 19 and 20, each volume 446a-446c of the previously adjusted UPC-level panel data is then multiplied by the blended factor to arrive at the newly adjusted panel values 450a-450c (stage 298 in FIG. 9, and stage 310 in FIG. 10).

FIG. 21 is a data table illustrating hypothetical table 460 of end results for POS data elements by retailers 2 and 3, with a comparison to reality FIGS. 462a-462b, pre-fusion FIGS. 464a-464b, and post-fusion FIGS. 466a-466b to show how the competitive and complementary fusion processes according to FIGS. 4-10 and illustrated in the hypothetical of FIGS. 11-20 helped improve the data accuracy.

Figure 22:
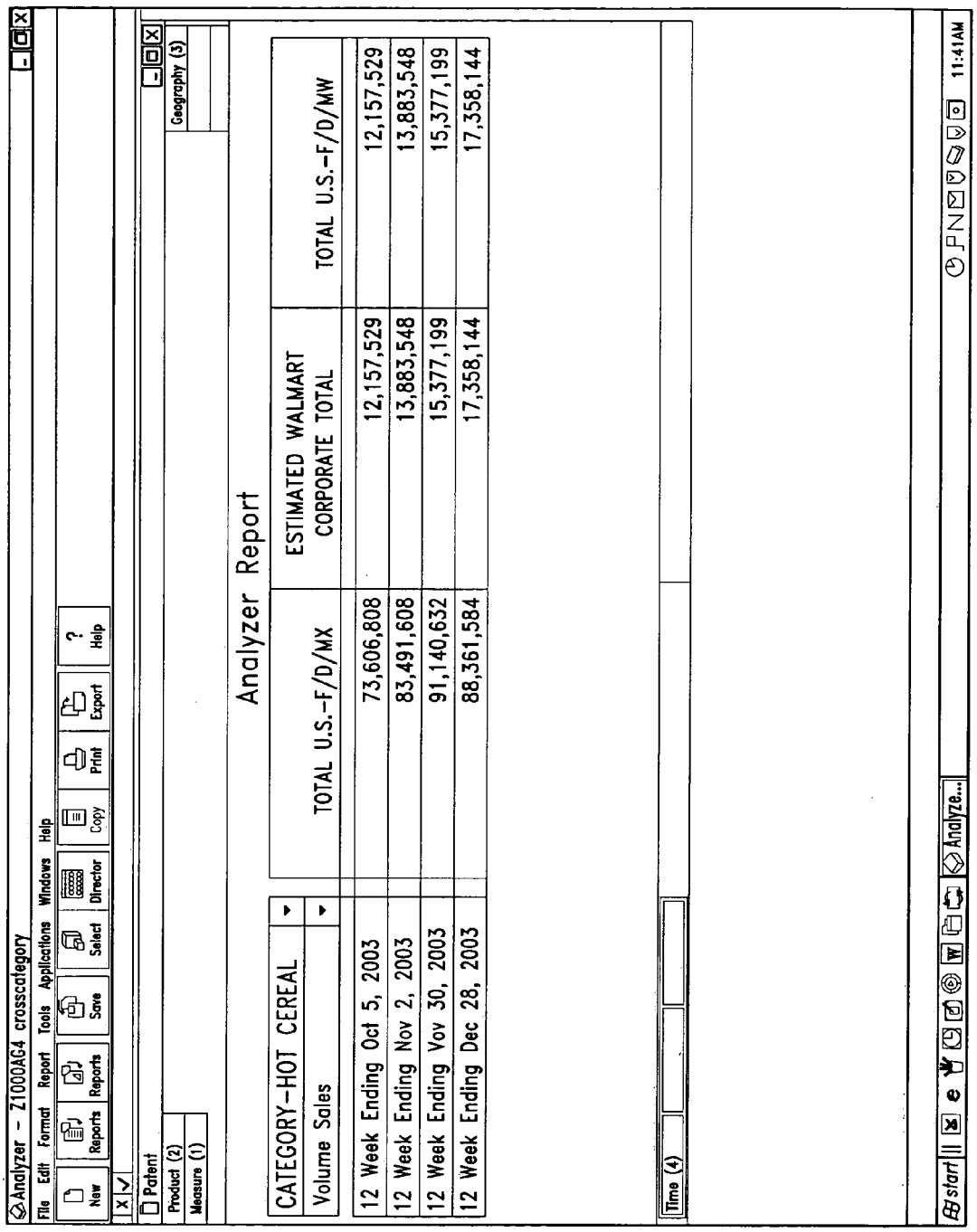
FIG. 22 is a simulated screen of a user interface for one or more client workstations of FIG. 1 that allows a user to view the multi-dimensional elements in the database, as described in the procedures of FIG. 4 and FIG. 5.

FIG. 22 is a simulated screen of a user interface for one or more client workstations 30 that allows a user to view the multi-dimensional elements in the database, as described in the procedures of FIG. 4 and FIG. 5.

Alternatively or additionally, once data fusion has been performed as described herein, the updated data can be used by various systems, users, and/or reports as appropriate.

In one embodiment of the present invention, a method is disclosed comprising identifying a plurality of data sources, wherein at least a first data source is more accurate than a second data source; identifying a plurality of overlapping attribute segments to use for comparing the data sources; calculating a factor as a function of each of the plurality of overlapping attribute segments; and using the factors to update a first group of values in the second data source to reduce bias.

In another embodiment of the present invention, a method is disclosed comprising receiving point-of-sale data and panel data on a periodic basis; identifying a plurality of product identifiers and a plurality of attributes to analyze; retrieving and summarizing the point-of-sale data and the panel data by the plurality of product identifiers, the plurality of attributes, and a plurality of corresponding attribute segments for a specified time period; calculating a factor for each attribute segment of a particular attribute; and applying the factors for the particular attribute segment to the panel data to correct panel bias.

In yet another embodiment, a method is disclosed comprising receiving point-of-sale data and panel data on a periodic basis; identifying a plurality of product identifiers and a plurality of attributes to analyze; retrieving and summarizing the point-of-sale data and the panel data by the plurality of product identifiers, the plurality of attributes, and a plurality of corresponding attribute segments for a specified time period; calculating a plurality of factors, wherein one factor is calculated for each attribute segment of the plurality of attributes; and applying the factors to the second data source to reduce bias; and applying the factors to the second data source to reduce incompleteness.

In yet a further embodiment, a method is disclosed comprising identifying a plurality of product identifiers and a plurality of attributes to analyze for at least two data sources, wherein at least a first data source is more accurate than a second data source; retrieving and summarizing the first data source and the second data source by the plurality of product identifiers, the plurality of attributes, and a plurality of corresponding attribute segments for a specified time period; calculating a plurality of factors, wherein one factor is calculated for each attribute segment of the plurality of attributes; applying the factors to the second data source to reduce bias; and applying the factors to a different or overlapping dataset of the second data source to reduce incompleteness.

In another embodiment, a system is disclosed that comprises one or more servers being operable to store retail data from at least two data sources, store product identifier and attribute categorizations, and store a plurality of factor calculations; wherein the at least two data sources includes a first data source that is more accurate than a second data source; and wherein one or more of said servers contains business logic that is operable to identify and retrieve a plurality of overlapping attribute segments to use for comparing the at least two data sources, compare each of the overlapping attribute segments, calculate a factor for each of the overlapping attribute segments, and use the factors to update a first group of values in the second data source to reduce bias.

In yet a further embodiment, an apparatus is disclosed that comprises a device encoded with logic executable by one or more processors to: identify and retrieve a plurality of overlapping attribute segments to use for comparing at least two data sources, wherein the at least two data sources includes a first data source that is more accurate than a second data source, compare each of the overlapping attribute segments, calculate a factor for each of the overlapping attribute segments, and use the factors to update a first group of values in the second data source to reduce bias.

A person of ordinary skill in the computer software art will recognize that the client and/or server arrangements, user interface screen content, and data layouts could be organized differently to include fewer or additional options or features than as portrayed in the illustrations and still be within the spirit of the invention.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

What is claimed is:

1. A system comprising:
   one or more computers being operable to store:
      retail data associated with a first entity, the retail data including data from a first data source and a second data source, the retail data further including product identifiers;
      retail data associated with a second entity, the retail data including product identifiers, the retail data including data from a third data source; and
      a plurality of factor calculations;
   wherein one or more of said computers contains business logic that is operable to:
      identify and retrieve, based on the product identifiers, a plurality of overlapping attribute segments to use for comparing the data from the first and second data sources,
      compare the plurality of the overlapping attribute segments,
      calculate a plurality of factors for each of the overlapping attribute segments, each factor representing a bias present in the second data source, and
      use the factors to adjust the values in the retail data from the third data source, thereby reduce bias present in the third source.

2. The system of claim 1, wherein the one or more servers are further operable to use the factors to update the retail data from the third data source to reduce incompleteness.

3. The system of claim 1, wherein the one or more servers are further operable to calculate the factor for an overlapping attribute segment by dividing a first data source volume amount by a corresponding second data source volume amount.

4. The system of claim 1, wherein the one or more computers are further operable apply the factor for the attribute segment to the retail data from the third data source by multiplying a plurality of third data source volume amounts by the factor for the corresponding attribute segment.

5. The system of claim 1, wherein the one or more computers are further operable to only calculate the factors for each attribute that is identified in the server to be relevant.

6. The system of claim 1, wherein the one or more computers are further operable to only calculate the factors for attribute segments that are determined to be significant.

7. The system of claim 1, wherein the one or more computers are further operable to save each factor in a database.

8. The system of claim 2, wherein the one or more computers are further operable to calculate a blended factor when at least two measures are available for a same factor, said blended factor being used to reduce bias in the second or third data source.

9. The system of claim 8, wherein the one or more computers are further operable to calculate the blended factor by giving a more accurate data source a higher relative weight and by giving a less accurate data source a lower relative weight.

10. The system of claim 1, wherein the one or more computers are further operable to calculate a blended factor when at least two measures are available for a same factor, said blended factor being used to reduce bias in the second data source.

11. The system of claim 10, wherein the one or more computers are further operable to calculate the blended factor by giving the more accurate data source a higher relative weight and by giving the less accurate data source a lower relative weight.

12. The system of claim 1, further comprising:
   a user station coupled to the one or more computers over a network, wherein the user station includes a display, and is operable to present a graphical user interface that allows a user to administer a plurality of settings used for analyzing and correcting the data sources.

13. The system of claim 1, further comprising:
   a number of user stations coupled to the one or more computers over a network, wherein each of the user stations includes a respective one of a number of displays, and is operable to present a graphical user interface that allows a user to view the corrected data in a multidimensional format.

14. The system of claim 1, wherein the product identifiers in the first or second data sources include universal product codes.

15. The system of claim 1, wherein the one or more computers further contain business logic operable to:
   use the factors to adjust values in the retail data from the second data source, thereby reduce bias present in the second source.

16. The system of claim 1, wherein the first data source includes point-of-sale data from a first retailer, the second data source includes panel data from the first retailer, and the third data source includes panel data from a second retailer.

17. The system of claim 1, wherein the one or more computers are further operable to store retail data from a fourth data source corresponding to the second entity, and wherein the one or more computers further contains business logic that is operable to:
   use the factors to adjust values in the retail data from the fourth data source, thereby reducing bias present in the fourth data source.

18. The system of claim 17, wherein the fourth data source includes product shipment data.

19. The system of claim 1, wherein the one or more computers are further operable to store retail data from a fourth data source corresponding to the second entity, wherein the fourth data source contains product identifiers, and wherein the one or more computers further contains business logic that is operable to:

identify and retrieve, based on the product identifiers, a plurality of overlapping attribute segments to use for comparing the data from the first and second data sources, compare the plurality of the overlapping attribute segments, calculate a plurality of factors for each of the overlapping attribute segments, each factor representing a bias present in the second data source, and use the factors to adjust the values in the retail data from the third data source, thereby reduce bias present in the third source.

20. The system of claim 1, wherein retail data consists of one or more of:

point of sale data, consumer panel data, shipment data, channel report data reported sale data, store database data, geo-demographic data, category studies, industry reports, delivery data, retailer-supplied data, audit data, causal data, promotional data, population census data, geographic data, store universe data, supply chain data, loyalty card data, and survey-based data.

21. The system of claim 20, wherein retail data consists of one or more of:

point of sale data and consumer panel data.

22. A method comprising:

using a computer, identifying a first entity with corresponding first and second retail data sources, the first and second data sources including product identifiers;

identifying a second entity and a corresponding third data source, the third data source including product identifiers;

based on the product identifiers of the first, second, and third data sources, identifying a plurality of overlapping attribute segments among the first, second, and third data sources to use for comparing the data sources;

calculating at least one factor as a function of at least one of the overlapping attribute segments among the first and second data sources; and using the at least one factor to create modified values in the third data source, said modified values having a reduced bias compared to the original, non-modified values.

23. The method of claim 22, wherein the first data source is point-of-sale data and the second data source is consumer panel data.

24. The method of claim 22, wherein the first data source does not include shipment data.

25. The method of claim 24, wherein the second data source does not include shipment data.

26. The method of claim 22, wherein the data sources are compared based on a common time dimension.

27. The method of claim 22, wherein the data sources are compared based on a common venue dimension.

28. The method of claim 22, wherein the data sources are compared based on a common product dimension.

29. The method of claim 22, further comprising:

determining that additional data sources are available for comparison;

using the additional data sources to calculate additional factors; and applying the additional factors to the third data source.

30. The method of claim 22, wherein the using the at least one factor step is repeated multiple times to further improve the accuracy of the second data source.

31. The method of claim 26, wherein the first data source is point-of-sale data that was captured with a reader, and wherein the data sources are compared based on a common time dimension, and wherein the factors are used to update a first group of values in the second data source to reduce bias.

32. The method of claim 22, wherein retail data consists of one or more of:

point of sale data, consumer panel data, shipment data, channel report data reported sale data, store database data, geo-demographic data, category studies, industry reports, delivery data, retailer-supplied data, audit data, causal data, promotional data, population census data, geographic data, store universe data, supply chain data, loyalty card data, and survey-based data.

33. The method of claim 32, wherein retail data consists of one or more of:

point of sale data and consumer panel data.

* * * * *